United States Patent
Simplicio, Jr. et al.

(10) Patent No.: US 12,284,293 B2
(45) Date of Patent: Apr. 22, 2025

(54) BALANCING PRIVACY AND EFFICIENCY FOR REVOCATION IN VEHICULAR PUBLIC KEY INFRASTRUCTURES

(71) Applicants: LG ELECTRONICS, INC., Seoul (KR); UNIVERSITY OF SAO PAULO, Sao Paulo (BR)

(72) Inventors: Marcos A. Simplicio, Jr., São Paulo (BR); Eduardo Lopes Cominetti, São Paulo (BR); Harsh Kupwade Patil, Fremont, CA (US); Jefferson E. Ricardini Fernandes De Oliveira, São Paulo (BR); Marcos Vinicius M. Silva, São Paulo (BR)

(73) Assignees: LG ELECTRONICS, INC., Seoul (KR); UNIVERSITY OF SAO PAULO, Sao Paulo (BR)

( * ) Notice: Subject to any disclaimer, the term of this patent is extended or adjusted under 35 U.S.C. 154(b) by 248 days.

(21) Appl. No.: 17/767,003

(22) PCT Filed: Oct. 7, 2020

(86) PCT No.: PCT/US2020/054537
§ 371 (c)(1),
(2) Date: Apr. 6, 2022

(87) PCT Pub. No.: WO2021/071918
PCT Pub. Date: Apr. 15, 2021

(65) Prior Publication Data
US 2022/0376931 A1      Nov. 24, 2022

Related U.S. Application Data

(60) Provisional application No. 62/942,747, filed on Dec. 3, 2019, provisional application No. 62/912,069, filed on Oct. 8, 2019.

(51) Int. Cl.
*H04L 9/32* (2006.01)
*H04L 9/00* (2022.01)

(52) U.S. Cl.
CPC .......... *H04L 9/3268* (2013.01); *H04L 9/006* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 6,223,291 B1 * | 4/2001 | Puhl | ............... | H04L 63/0823 726/28 |
| 6,961,849 B1 * | 11/2005 | Davis | ............... | G06Q 20/3829 705/76 |
| 8,060,741 B2 * | 11/2011 | Wang | ............... | H04L 9/0833 713/155 |

(Continued)

*Primary Examiner* — Kambiz Zand
*Assistant Examiner* — Mahabub S Ahmed
(74) *Attorney, Agent, or Firm* — Duane Morris LLP

(57) ABSTRACT

According to some embodiments, systems and methods are provided for revoking one or more of a plurality of entities in a vehicular public-key infrastructure. The systems and methods balance privacy and efficiency by distributing activation codes according to various approaches, including a direct request approach, a fixed-size subset approach, and a variable-size subset approach.

16 Claims, 20 Drawing Sheets

(56) References Cited

U.S. PATENT DOCUMENTS

| | | | |
|---|---|---|---|
| 8,230,215 B2* | 7/2012 | Laberteaux | H04L 63/0823 713/180 |
| 8,522,013 B2* | 8/2013 | Zhang | H04L 63/20 713/158 |
| 9,985,946 B2* | 5/2018 | Smith | H04W 4/70 |
| 10,149,159 B1* | 12/2018 | Perfitt | H04L 9/3265 |
| 10,439,825 B1* | 10/2019 | Meyer | H04L 9/088 |
| 2004/0185842 A1* | 9/2004 | Spaur | B60R 25/33 455/410 |
| 2005/0188196 A1* | 8/2005 | Kakii | H04L 9/3263 713/156 |
| 2006/0255910 A1* | 11/2006 | Fukushima | E05B 49/00 340/5.26 |
| 2007/0223702 A1* | 9/2007 | Tengler | H04L 9/3263 380/270 |
| 2009/0235071 A1* | 9/2009 | Bellur | H04W 12/082 713/158 |
| 2009/0259841 A1* | 10/2009 | Laberteaux | H04L 63/0823 713/156 |
| 2011/0083011 A1* | 4/2011 | DiCrescenzo | H04L 63/0823 713/158 |
| 2014/0289512 A1* | 9/2014 | Tseng | H04L 9/3268 713/158 |
| 2014/0307873 A1* | 10/2014 | Park | H04W 12/0433 380/270 |
| 2015/0100778 A1* | 4/2015 | Andrews | H04L 63/0823 713/156 |
| 2016/0087804 A1* | 3/2016 | Park | H04L 9/3268 713/156 |
| 2016/0119151 A1* | 4/2016 | Park | H04W 12/043 713/158 |
| 2017/0111176 A1* | 4/2017 | Angus | H04L 63/0823 |
| 2017/0222990 A1* | 8/2017 | Romansky | H04L 9/3268 |
| 2017/0359370 A1* | 12/2017 | Humphries | G06F 21/6218 |
| 2018/0006829 A1* | 1/2018 | Kravitz | H04W 12/06 |
| 2018/0018663 A1* | 1/2018 | Van | G07F 7/0873 |
| 2018/0019999 A1* | 1/2018 | Naegle | H04L 63/0823 |
| 2018/0062860 A1* | 3/2018 | Gajjala | G06F 9/4401 |
| 2018/0091315 A1* | 3/2018 | Singhal | G06F 12/0238 |
| 2018/0137261 A1* | 5/2018 | Lattin | G06F 21/572 |
| 2018/0181756 A1* | 6/2018 | Campagna | H04L 9/088 |
| 2018/0359241 A1* | 12/2018 | Brockhaus | H04L 63/062 |
| 2019/0044738 A1* | 2/2019 | Liu | H04W 4/40 |
| 2019/0124112 A1* | 4/2019 | Thomas | G06F 21/44 |
| 2019/0149342 A1* | 5/2019 | Fynaardt | H04L 9/0891 713/156 |
| 2019/0190929 A1* | 6/2019 | Thomas | H04L 51/212 |
| 2019/0268420 A1* | 8/2019 | Acharya | H04L 63/166 |
| 2019/0349426 A1* | 11/2019 | Smith | H04L 9/3239 |
| 2020/0012527 A1* | 1/2020 | Hartsock | H04L 9/14 |
| 2020/0136838 A1* | 4/2020 | Kucharski | H04L 9/3265 |
| 2020/0228326 A1* | 7/2020 | Yasmin | H04L 9/0819 |
| 2020/0304994 A1* | 9/2020 | Breuer | H04W 4/40 |
| 2020/0374137 A1* | 11/2020 | Godfrey | H04L 9/3268 |
| 2023/0029523 A1* | 2/2023 | Cunha | H04L 9/3247 |

* cited by examiner

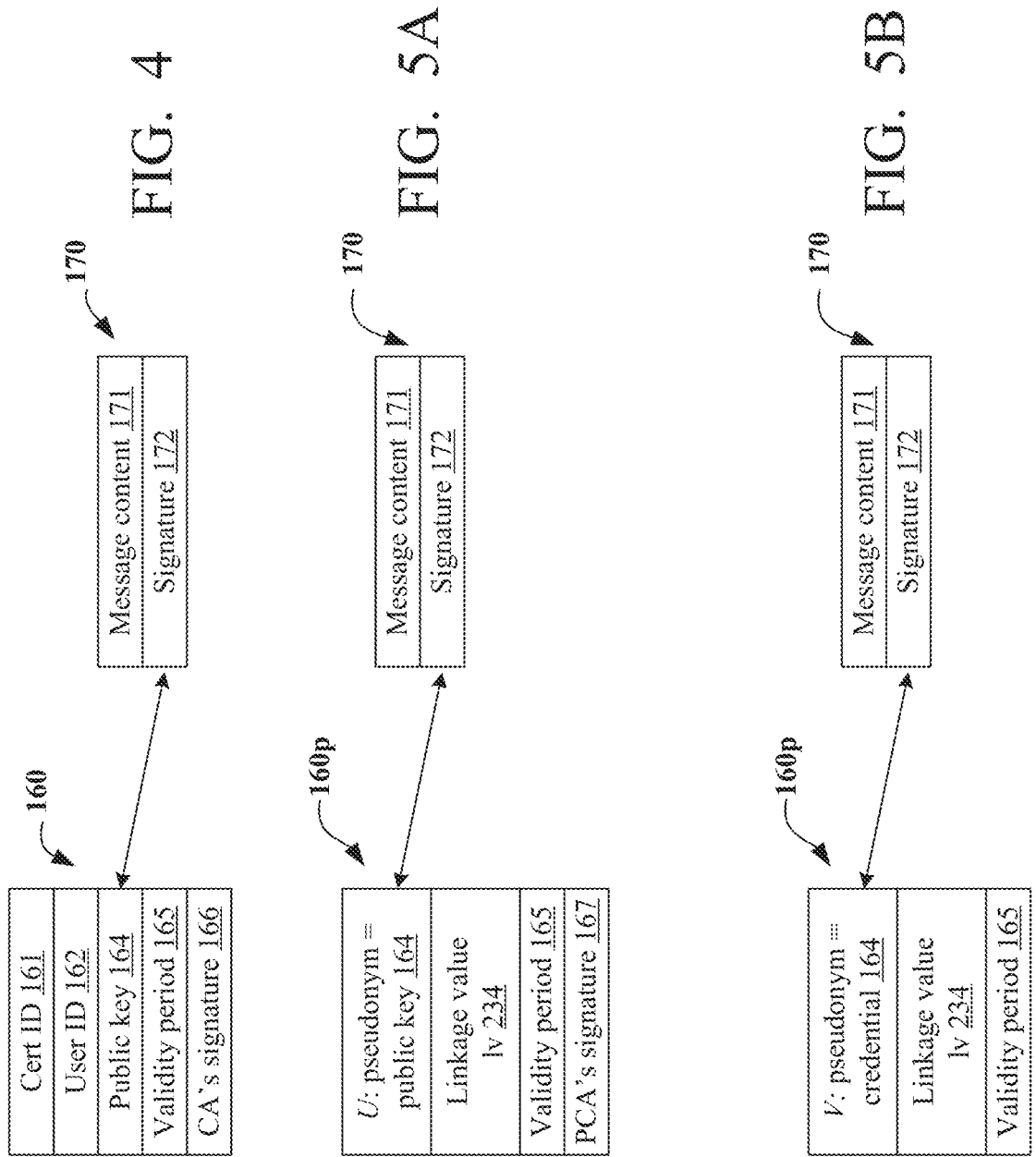

Algorithm 1: Pseudocode for Node Selection: applies to FSS and VSS

Data: Available[0..D]; /* Array with lists of nodes available at each depth, from 0 to $D$ */
Data: Path[0..D]; // Nodes in vehicle's leaf-to-root path
Data: *privacy*; // Target privacy in VSS (set 0 in FSS)
Result: Selected[0..D]; /* Array with lists of nodes picked at each depth, from 0 to $D$*/

// Number of nodes to pick. If privacy = 0, *toSelect* = $D$
*toSelect* = *NumberNodes(privacy)*;
If *Available*[0]≠*null* then   /* If root is available: no revocation yet*/
| *Selected*[0].***AddIndex*(1)**   // The root is returned
else
| for $d = 1$ to $D$ do   /* Tries picking nodes from all depths */
| | if *Available*[d] Ê Path[d] then   /* Check if required node n* is here */
| | | /* A.MoveTo(B,n): moves node n from list A to list B   */
| | | ***Available*[d].*MoveTo*(*Selected*[d], *Path*[d])**;
| | | // Pick that node
| | | *toSelect* = *toSelect*–1; // 1 less node to pick
| | else if *Available[d]≠null* then
| | | /* A.MoveRndTo(B): moves random node from list A to list B   */
| | | ***Available*[d].*MoveRndTo*(Selected[d])**;
| | | // Add random pick
| | | *toSelect* = *toSelect*–1; // 1 less node to pick
| | end
| end
| // If extra nodes are required, select more top-bottom
| for $d = 1$ ; $d \leq D$ and *toSelect* > 0; $d = d + 1$ do
| | while *Available*[d]≠*null* and *toSelect* > 0 do
| | | *Available*[d].*MoveRndTo*(*Selected*[d]);
| | | *toSelect* = *toSelect* – 1;
| | end
| end
end

FIG. 17

BALANCING PRIVACY AND EFFICIENCY FOR REVOCATION IN VEHICULAR PUBLIC KEY INFRASTRUCTURES

CROSS REFERENCE TO RELATED APPLICATIONS

The present application claims priority to U.S. Provisional Patent Application Nos. 62/912,069, "BALANCING PRIVACY AND EFFICIENCY IN NR V2X," filed on 8 Oct. 2019, and 62/942,747, "REVOCATION IN VEHICULAR PUBLIC KEY INFRASTRUCTURES: BALANCING PRIVACY AND EFFICIENCY," filed 3 Dec. 2019, and PCT/US2020/54537 application filed on 7 Oct. 2020, all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to secure communications, including transportation-related communications among cars, trucks, trains, and possibly other vehicles, as well as pedestrians' smartphones, traffic lights, and other infrastructure.

BACKGROUND OF THE INVENTION

In recent times, there has been a surge in digital technologies embedded in physical objects, leading to what is today known as the Internet of Things (IoT). This trend has also reached the automotive industry, which has shown a growing interest in exploring interaction models such as Vehicle-to-Vehicle (V2V), Vehicle-to-Infrastructure (V2I), and Vehicle-to-Pedestrian (V2P), collectively referred to as Vehicle-to-Everything (V2X) communications. V2X enables several applications aimed at improving transportation safety, efficiency, and human to machine interaction. For example, with V2X, vehicles can exchange or communicate information (e.g., for velocity, direction, and brake status) that can help drivers keep a safe distance from other vehicles while maintaining a suitable speed.

Indeed, the U.S. Department of Transportation has initiated a "connected vehicles" program "to test and evaluate technology that will enable cars, buses, trucks, trains, roads and other infrastructure, and our smartphones or other devices to 'talk' to one another. Cars on the highway, for example, would use short-range radio signals to communicate with each other so every vehicle on the road would be aware of where other nearby vehicles are. Drivers would receive notifications and alerts of dangerous situations, such as someone about to run a red light as they [are] nearing an intersection or an oncoming car, out of sight beyond a curve, swerving into their lane to avoid an object on the road." U.S. Department of Transportation at https://www.its.dot.gov/cv_basics/cv_basics_what.htm. "Connected vehicles could dramatically reduce the number of fatalities and serious injuries caused by accidents on our roads and highways. [They] also promise to increase transportation options and reduce travel times. Traffic managers will be able to control the flow of traffic more easily with the advanced communications data available and prevent or lessen developing congestion. This could have a significant impact on the environment by helping to cut fuel consumption and reduce emissions."

While V2X technology and connected vehicles offer the promise of increased safety, traffic flow, efficiency, etc., the large scale deployment of such technologies also requires addressing some challenges, especially security and privacy concerns. In particular, V2X architectures are expected to (1) ensure that messages exchanged between vehicles are legitimate, banning misbehaving users, while (2) preserving the anonymity of honest users, so their movements cannot be easily tracked by other vehicles or by the system itself.

BRIEF DESCRIPTION OF THE DRAWINGS

FIGS. 4, 5A, and 5B illustrate examples of digital certificates for message authentication, according to some embodiments.

FIG. 17 illustrates an example algorithm for selecting nodes of an activation tree to be revoked, balancing privacy and efficiency, according to some embodiments.

DETAILED DESCRIPTION OF SOME EMBODIMENTS

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Example Environment

Figure 1:
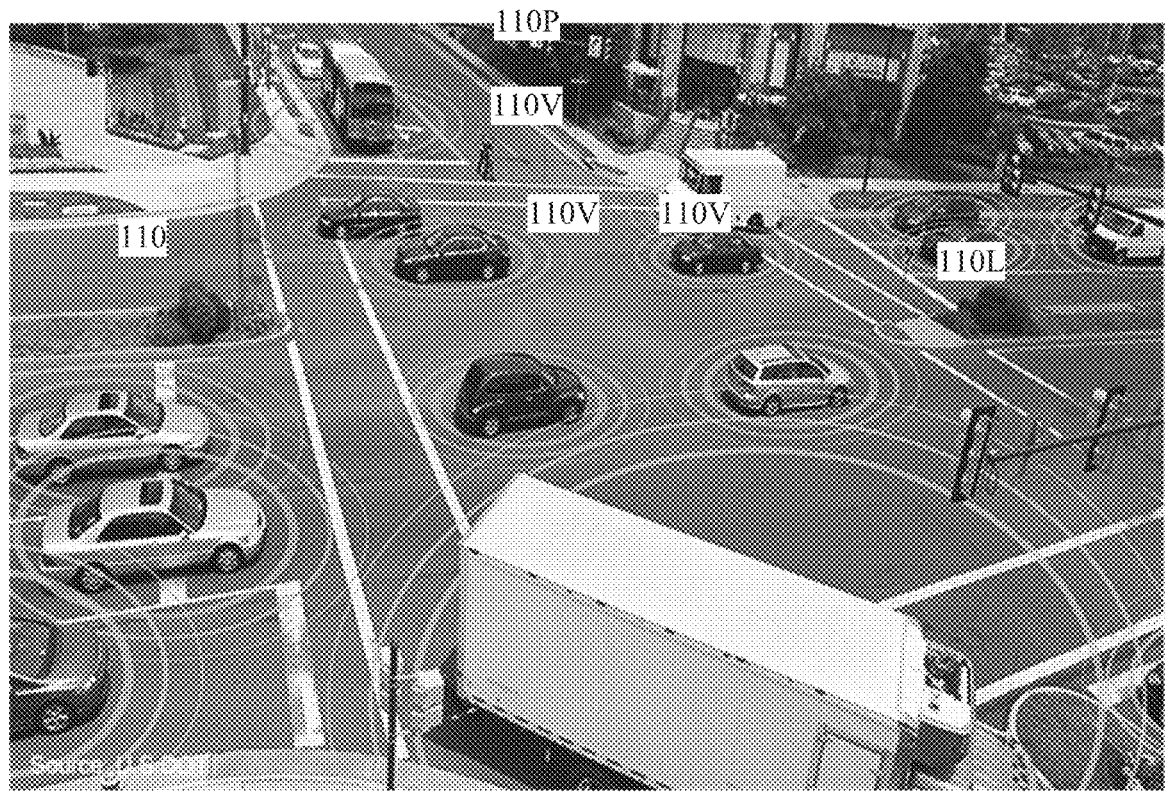
FIG. 1 illustrates an environment in which systems and methods of the present disclosure can operate.

FIG. 1 illustrates an environment in which systems and methods of the present disclosure can operate. In some embodiments, the environment can be a Security Credential Management System (SCMS) infrastructure. The SCMS was developed in cooperation with the U.S. Department of Transportation (USDOT) and the automotive industry. FIG. 1 shows a busy intersection with various entities or objects, such as vehicles 110V (cars, trucks, and possibly other types, e.g., trains or bicycles), pedestrians 110P, roadside equipment 110L (e.g., traffic lights, along with hub or gateway for short and longer-range communications). Each of the objects or entities 110 (110V, 110L, 110P, etc.) carries or incorporates equipment, such as smartphones, automotive information devices, or other computing devices. Using their respective computing devices, the objects or entities 110 communicate (e.g., wirelessly) to share information, coordinate, etc. This vehicular communications technology (also denominated Vehicle-to-Everything, or V2X) is a cornerstone for the development of Intelligent Transportation Systems (ITS).

Each vehicle 110V may, for example, broadcast its location, speed, acceleration, route, direction, weather information, etc. Such broadcasts can be used to obtain advance information on traffic jams, accidents, slippery road conditions, and allow each vehicle to know where the other vehicles are, and so on. In response, vehicle recipients of such information may alert their drivers, to advise the drivers to stop, slow down, change routes, take a detour, and so on. The traffic lights can be automatically adjusted based on the traffic conditions broadcast by the vehicles and/or other objects 110.

Figure 2:
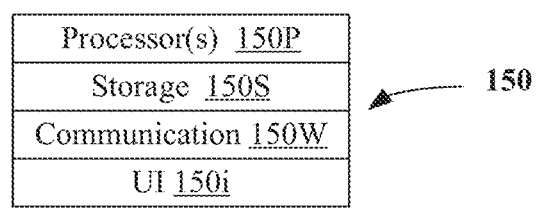
FIG. 2 is a block diagram of a computing device which can be used by any of the entities shown in FIG. 1, according to some embodiments.

FIG. 2 illustrates an embodiment of a computing device 150 which is used by the vehicles or other entities and objects, e.g., for communicating, coordinating, etc. in the environment of FIG. 1.

As shown in FIG. 2, the computing device 150 includes one or more computer processors 150P coupled to computer storage (memory) 150S, and wireless communication equipment 150W for radio communications. Operation of computing device 150 is controlled by processor 150P, which may be implemented as one or more central processing units, multi-core processors, microprocessors, microcontrollers, digital signal processors, field-programmable gate arrays (FPGAs), application-specific integrated circuits (ASICs), graphics processing units (GPUs), tensor processing units (TPUs), and/or the like in computing device 150P.

Memory 150S may be used to store software executed by computing device 150 and/or one or more data structures used during the operation of computing device 150. Memory 150S may include one or more types of machine-readable media. Some common forms of machine-readable media may include a floppy disk, a flexible disk, hard disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor 150P and/or memory 150S may be arranged in any suitable physical arrangement. In some embodiments, processor 150P and/or memory 150S may be implemented on the same board, in the same package (e.g., system-in-package), on the same chip (e.g., system-on-chip), and/or the like. In some embodiments, processor 150P and/or memory 150S may include distributed, virtualized, and/or containerized computing resources. Consistent with such embodiments, processor 150P and/or memory 150S may be located in one or more data centers and/or cloud computing facilities. In some examples, memory 150S may include non-transitory, tangible, machine-readable media that include executable code that when run by one or more processors (e.g., processor 150P) may cause the computing device 150, alone or in conjunction with other computing devices in the environment, to perform any of the methods described further herein The computing device or equipment 150 may include user interface 150*i*, e.g., such as present in a smartphone, an automotive information device, or of some other type device, for use by pedestrians, vehicle drivers, passengers, traffic managers, and possibly other people.

Figure 3A:
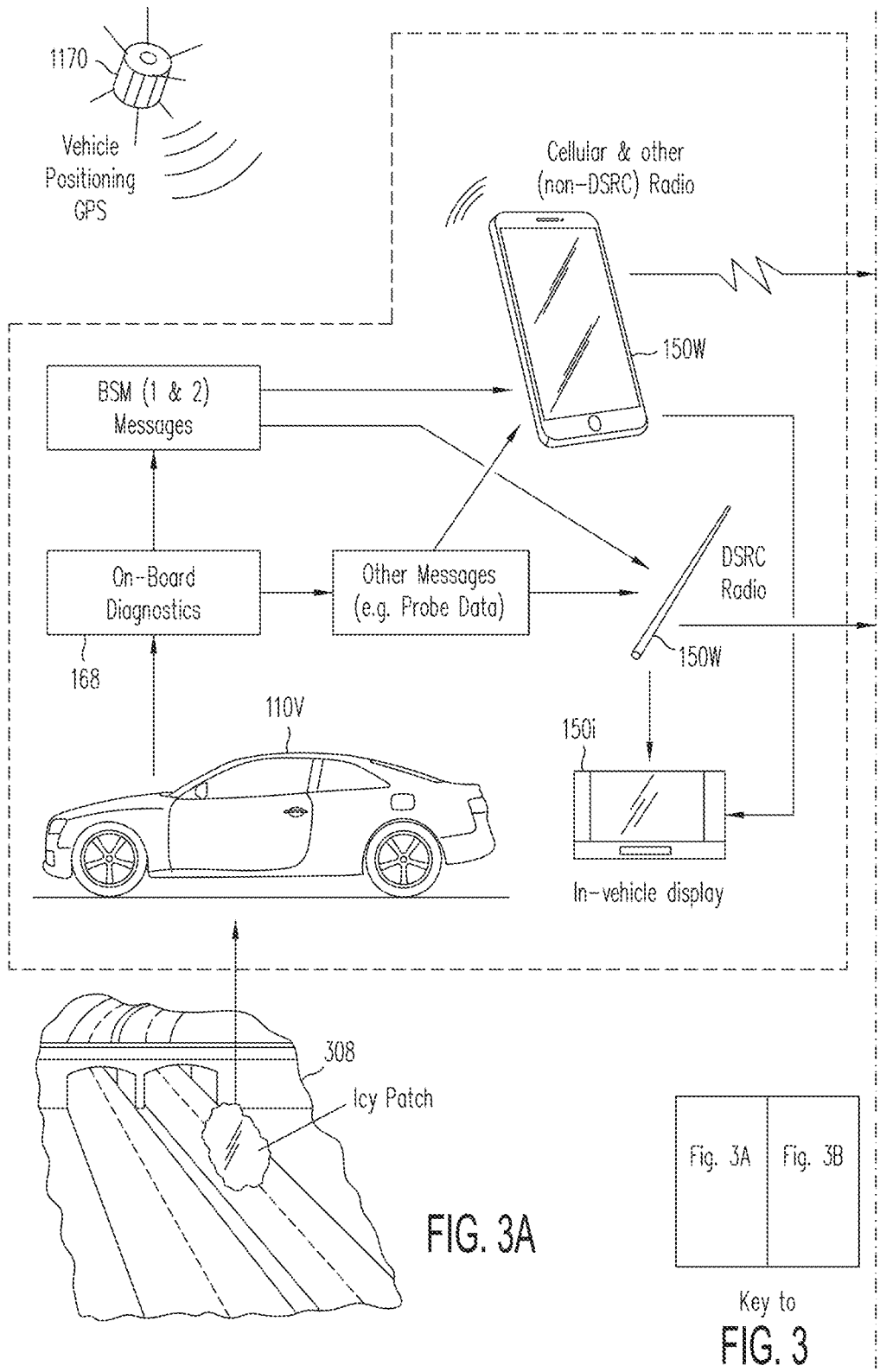
FIGS. 3A and 3B are a representation of communications among vehicles and other equipment in the example environment, according to some embodiments.
Figure 3B:
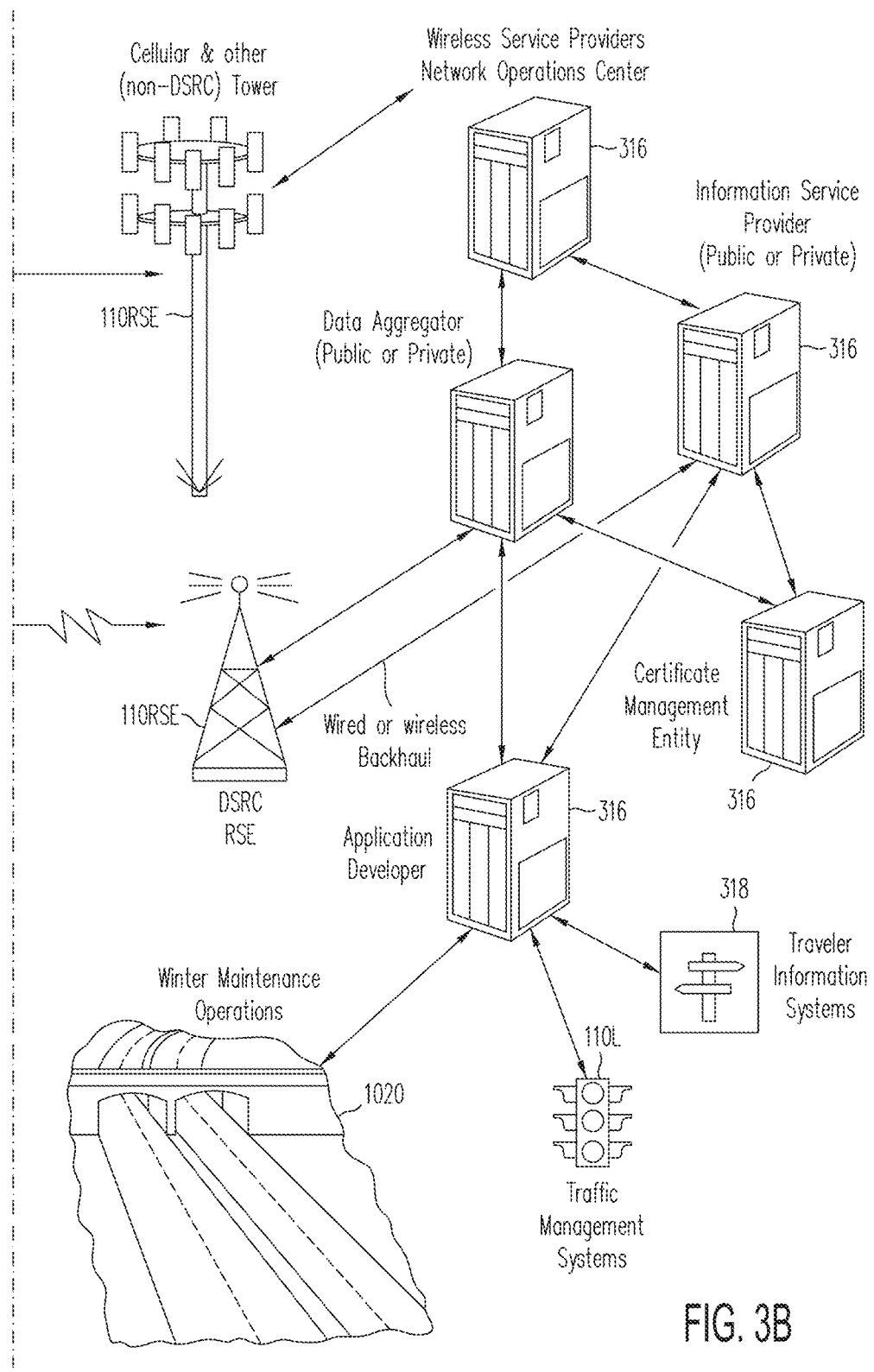

FIGS. 3A and 3B (which together make up FIG. 3) illustrate examples of communication schemes for entities or objects 110 or their computing devices 150 ("object 110," "user 110," and "equipment 150" may be used interchangeably herein when no confusion arises), interacting via V2X or connected vehicle technology. At scene 308, a vehicle 110V encounters an icy road patch.

The vehicle 110V includes On-Board Equipment (OBE) 304 with one or more sensors—such as accelerometers, brake monitors, object detectors, LIDAR, etc.—for sensing conditions within and around vehicles 110V, such as sudden braking, wheel spin, potential collisions, etc. Using these sensors, the vehicle 110V may, for example, detect the icy road patch at scene 308. The sensors supply information to the OBE's computing device or equipment 150 (FIG. 2) so that it can take action accordingly, e.g., by automatically applying brakes, adjusting steering, and/or notifying the user via a display 150*i* in case the user needs to react. The computing device 150 may comprise an on-board diagnostics module 168 for performing diagnostics or analysis, for example, on the information provided by the sensors.

Different pieces of equipment on the vehicle 110V communicate by exchanging Basic Safety Messages (BSM) and/or other messages with each other and other vehicles. The BSM messages are described in detail in Whyte et al., "A security credential management system for V2V communications," *IEEE Vehicular Networking Conference*, 2013, pp. 1-8, and CAMP, "Security credential management system proof-of-concept implementation—EE requirements and specifications supporting SCMS software release 1.1," *Vehicle Safety Communications Consortium, Tech. Rep.*, May 2016 (available: https:/www.its.dot.gov/pilots/pdf/SCMS_POC_EE_Requirements.pdf), both of which are incorporated by reference.

A vehicle or other object 110 can obtain its location, for example, by using GPS satellites 1170 or cellular triangulation. The vehicle 110V may also include communication equipment 150W, which, in some embodiments, can include a Direct Short Range Communications (DSRC) radio and non-DSRC radio equipment such as a mobile phone. The vehicle may thus communicate through a cellular system or other roadside equipment (RSE) 110RSE directly, i.e., without intermediate network switches. The RSE may act as a gateway to other networks, e.g., the Internet. Using the communication equipment 150W, vehicle 110 can communicate BSM messages and other information to other vehicles, entities, or objects 110 in the V2X or connected vehicle environment. Thus, vehicle 110V/150 may inform the other parts of the environment of the icy patch at scene 308. Likewise, another vehicle 110 may be located in scene 1020 and may alert other vehicles of winter maintenance operations at that scene.

A traffic management system 110L may comprise equipment—e.g., stoplights, crosswalk lights, etc. located in or near roads, highways, crosswalks, etc.—to manage or control traffic of vehicles, persons, or other objects and entities. Traffic management system 110L may include some of the same or similar equipment as vehicle 110V, including computing devices 150, sensors, user interfaces, communication equipment, etc.

Computer systems 316 process, aggregate, generate or otherwise operate on information sent to or received from vehicles 110V, traffic management systems 110L, and other objects or entities 110 in the V2X or connected vehicle technology environment, along with their respective computing devices 150. Also shown is a traveler information system 318. Computer systems 316 can be implemented in or incorporate, for example, one or more servers. These computer systems 316, for example, provide or support location and map information, driving instructions, traffic alerts and warnings, information about roadside services (e.g., gas stations, restaurants, hotels, etc.). The computer systems 316 may receive information from the various vehicles, entities, and objects 110 in the environment, process and communicate information or instructions throughout the environment to manage the objects, e.g., by adjusting signaling on traffic lights, rerouting traffic, posting alerts or warnings, etc.

This communication capability within the connected vehicle or V2X technology environment is potentially vulnerable to errors and abuse. A malicious user 110 (e.g., a vehicle operator or traffic manager) and/or defective equipment 150 may transmit false or incorrect information to other vehicles, so as to undesirably affect traffic. To protect the system from such misbehavior, the V2X communications should be authenticated, for example, using a vehicular public-key infrastructure (VPKI). VPKI solutions have been implemented in the Cooperative Intelligent Transport Systems (C-ITS), led by the European Telecommunications Standards Institute (ETSI), and the Security Credential Management System (SCMS), which is part of the IEEE 1609.2 standard. With a VPKI, each vehicle 110V or other equipment is provided with a private key (e.g., for signing a message) and a public key (e.g., for signature verification). The public key is distributed to the public, but the private key is kept secret.

VPKI issues multiple short-lived, pseudonym certificates to authorized vehicles. Each vehicle can then use its certificates to digitally sign its messages, so the authenticity of the conveyed information can be verified. A vehicle can also avoid tracking attempts by its peers if it periodically changes the pseudonym employed along the way: as a result, it should not be straightforward to link different messages to the same vehicle just by analyzing the corresponding certificates' contents.

To ensure that the messages exchanged between vehicles are legitimate, a vehicle may digitally sign each message using the vehicle's private key. The message recipient can verify the signature using the sending vehicle's public key. The public keys themselves are authenticated by means of digital certificates which certify that a given public key belongs to an authorized vehicle. The certificates are distributed by trusted computer entities called Certificate Authorities (CAs). Each certificate is signed by the CA, allowing the message recipient to confirm the certificate's authenticity by verifying the CAs signature.

FIGS. 4, 5A, and 5B illustrate examples of digital certificates which can be used for message authentication in the connected vehicle or V2X technology environment.

Referring to FIG. 4, a digital certificate 160 is shown. Digital certificate 160 has a number of fields or parameters. In some embodiments, these include a certificate ID 161, a user ID 162 (e.g., a vehicle ID number or the user's email address), the vehicle's (or user's) public key 164, and possibly other parameters (called metadata), such as the certificate's validity period 165, an identification of the signature scheme, and maybe others. Certificate 160 also includes a signature 166 formed by a certificate authority (CA) over all the fields of the certificate except the signature itself. The CA may reside on or be implemented in computers 316 for example.

Digital certificate 160 can be issued to a vehicle 110V to authenticate the public key 164. The vehicle 110V attaches its certificate 160 to each message 170 transmitted by the vehicle. The message 170 includes message body or content 171, and a digital signature 172 generated by the vehicle using its private key. The message recipient uses the CA's public key to verify the signature 166 and thus authenticate the certificate 160 including the public key 164. The recipient then uses the public key 164 to verify the message signature 172 and thus authenticate the message. In some embodiments, the verification of the certificate's signature 166 and message signature 172 can also be combined (e.g., for better performance).

A disadvantage of a scheme or approach which uses certificates that include some form of identification (ID) is potentially compromising user privacy: if a vehicle's transmissions are intercepted, the vehicle can be tracked by tracking the certificate ID 161 or user ID 162 transmitted by the vehicle. More particularly, one important requirement of V2X and Intelligent Transportation Systems (ITS) technologies is to find an adequate balance between security and privacy: at the same time that messages exchanged between vehicles, infrastructure, pedestrians, etc. should be authenticated, dissuading misbehavior and preventing data forgery, the users' privacy should be preserved, so the system is not abused for mass surveillance purposes. This requirement calls for a privacy-preserving VPKI. In some embodiments, authorized vehicles are loaded with multiple pseudonym certificates, i.e., certificates that do not explicitly identify their owners. In some embodiments, such certificates have very small validity periods (e.g., 1 week), which may overlap (e.g., 100 certificates might be valid at the same time). Hence, vehicles can employ some strategy for rotating among pseudonyms when signing messages, thus avoiding long-term tracking.

Thus, according to some embodiments, to protect user privacy, the user can be issued multiple pseudonym certificates 160p (FIG. 5A) with random-looking strings ("pseudonyms") 164 instead of IDs 161 and 162. The vehicle then uses a pseudonym certificate instead of certificate 160 in message transmissions. The vehicle can automatically use different pseudonym certificates 160p for different messages 170 to avoid tracking.

FIG. 5A illustrates a pseudonym certificate 160p accompanying a message 170. The certificate is generated by a pseudonym certificate authority (PCA), also called authorisation certificate authority (ACA) in some embodiments. The pseudonym 164, also denoted as U, acts as both the certificate ID and the public key. The certificate 160p may include validity period 165, an identification of the signature scheme, PCA signature 167, and maybe other parameters, similarly to certificate 160 of FIG. 4. Pseudonym certificate 160p may also include linkage value (lv) 234 used for certificate revocation as described below. (The linkage values may or may not be used for some embodiments of the present invention.)

The vehicle attaches one of its pseudonym certificates 160p to each message 170 transmitted by the vehicle. The message recipient uses the PCA's public key to verify the PCA signature 167, and uses the pseudonym 164 to verify the message signature 172 and thus authenticate the message 170. In some embodiments, the verification of the certificate's signature 167 and message signature 172 can be combined (e.g., for better performance). Such pseudonym certificates are used in Security Credential Management System (SCMS) and later extended in CAMP.

FIG. 5B illustrates a variation, which may be called "implicit certificate." Instead of a public key U, the pseudonym field 164 includes "credential" data (or "public key reconstruction" data), denoted as V, allowing anyone having the PCA's public key to derive the certificate's public key U. In some embodiments, U is not stored in the certificate 160p. See for example "Certicom. Sec 4 v1.0: Elliptic curve Qu-Vanstone implicit certificate scheme (ECQV). Technical report, Certicom Research, 2013. http://www.secg.org/sec4-1.0.pdf, incorporated herein by reference.

When a message recipient needs to verify the message signature 172, the message recipient first reconstructs the user's public key U from the pseudonym 164 (V) and the PCA public key, and then uses the user's public key U to verify the signature. Since this process uses the PCA public key, this process not only authenticates the message 170 as coming from a user possessing the certificate 160p, but also verifies the certificate 160p as authenticated by PCA 210. A separate PCA signature 167 is therefore unnecessary and is omitted, reducing the certificate size.

It may be desirable to reduce the computation costs and the network bandwidth in provisioning and activating the certificates. Further, the use of certificates is complicated by the need to ensure that a dishonest, or "honest but curious," certificate management entities cannot easily compromise the system even if they collude. It may be desirable to reduce the security risks presented by the certificate management entities.

Certificate Revocation

If a vehicle misbehaves (maliciously or due to a malfunction), the vehicle's certificate (e.g., 160) should be revoked. In some embodiments, revocation can be achieved by having a trusted entity periodically distribute a list of revoked pseudonym certificates ("Certificate Revocation List," or CRL) to potential recipients of the vehicle's messages. In some embodiments, the CRL can be a list of identifiers for certificates that have not yet expired, but should not be considered valid anymore (e.g., because its owner's private key has been compromised). This list is signed by a trusted issuer (e.g., the authority that originally issued the certificate itself), so the authenticity of its contents can be verified.

While simple, this approach may have shortcomings when applied to the context of VPKIs. One refers to the asynchronous nature of CRLs, which may receive new entries and updates at any time. Traditional applications, such as web browsing, typically address this issue by directly contacting some authority and checking the current status of certificates (e.g., using the Online Certificate Status Protocol—OCSP). In V2X environments, however, such online verification would add too much overhead to vehicles, and may not even be possible due to limited connectivity. Hence, when CRLs are adopted, large delays (e.g., days) may be observed until revocation updates are delivered to all vehicles.

Another issue is that each vehicle is expected to carry from e.g., 20 to 100 pseudonym certificates for each week of operation. The CRL size is directly proportional to the number of revoked certificates or revoked vehicles. Therefore, if a regular CRL is employed, the number of CRL entries resulting from each vehicle revocation could be very large. For example, the CRL can be large if the number of revoked vehicles is large, or because a single vehicle may have multiple certificates corresponding to different validity periods. Further, a vehicle may have multiple certificates corresponding to the same validity period to make the vehicle difficult to trace by a malicious person, and this further increases the CRL size. Also, the CA will not issue a new certificate for use after the expiration of the revoked certificate's validity period 165. A large CRL takes much memory, network bandwidth, and searching time to determine if a given certificate is in the CRL. Also, a potential recipient device may be hard to reach, e.g., if it is powered down or is out of the network coverage area. Therefore, the CRL size should preferably be reduced.

Various proposals aim to deal with such growth of CRL size, improving the efficiency of CRL distribution.

For efficiency and reliability reasons, it is desirable to generate the pseudonym certificates in large batches, and to distribute the certificates to the vehicles well in advance of the certificates' validity periods 165. However, this policy potentially increases the CRL size because if a vehicle is misbehaving then the CRL may have to include the vehicle's certificates that have been issued to the vehicle but have not become valid yet. This can be avoided if the certificates are distributed "just-in-time," i.e., right before the certificate's validity period 165. This is the approach taken by C-ITS, which pre-loads vehicles with certificates covering only a short period (e.g., 3 months). As a result, vehicles are required to contact the VPKI quite often for renewing their certificates, and revoked vehicles can have their requests denied.

Another way to limit or reduce the CRL size is to use activation codes. When a vehicle receives a certificate, the vehicle cannot decrypt the certificate without an activation code. However, the activation code for each certificate is provided to the vehicle only shortly before the certificate's validity period. This scheme or technique, Issue First Activate Later (IFAL), is described in more detail in, for example, E. Verheul, "Activate later certificates for V2X—combining ITS efficiency with privacy," Cryptology ePrint Archive, Report 2016/1158, 2016, http://eprint.iacr.org/2016/1158; and V. Kumar, J. Petit, and W. Whyte, "Binary hash tree based certificate access management for connected vehicles," in Proc. of the 10th ACM Conference on Security and Privacy in Wireless and Mobile Networks, ser. WiSec'

17. New York, N.Y., USA: ACM, 2017, pp. 145-155; both incorporated herein by reference. In IFAL, large batches of pseudonym certificates are generated and provided to the vehicles in advance, but the certificates are unusable until activated with activation codes. The activation codes are small and are typically provided to the vehicles "just in time," i.e., right before each certificate's validity period 165. A separate activation code is generated for each validity period 165, and is valid for all the certificates having the same validity period. Only "honest" (not misbehaving) devices 110 receive the activation code. With IFAL, the certificates are generated in batch, possibly long in advance of their respective validity periods, but if a certificate is revoked it does not have to be included in the CRL if the activation code has not been issued. The CRL size is therefore reduced.

As long as revoked vehicles do not receive their corresponding activation codes, the result of IFAL is analogous to what is obtained with C-ITS. Indeed, in both cases, CRLs are not strictly necessary, since revoked vehicles are naturally evicted from the system after a short time. Actually, the distribution of CRLs might be restricted to exceptional scenarios, such as if the VPKI itself is compromised: in this case, the certificates from affected authorities could be revoked altogether via CRLs.

The IFAL approach requires vehicles to periodically contact the V2X infrastructure in order to obtain the activation codes, but since activation codes can be very small, this process can be less cumbersome than the "just-in-time" delivery of small batches of certificates immediately before their corresponding validity periods. However, since an activation code can be used with any certificate for the corresponding activation period, the activation code must be distributed over a secure communication channel to be unavailable to revoked certificate holders.

Another problem in any pseudonym certificate infrastructure is the potential compromise of the certificate authority (CA) that issues pseudonym certificates. Even without colluding with any other entity, in IFAL the CA can link the pseudonym certificates to the corresponding device (to the corresponding device's enrollment certificate provided to the CA). Therefore, the users' privacy depends on CA's willingness to delete the linking information.

One technique that addresses some of the problems noted above is Binary Hash Tree based Certificate Access Management (BCAM), more details of which are described in Kumar et al. Like IFAL, the BCAM scheme distributes pertinent data, called device-specific values (DSVs), "just in time" to allow the vehicles to activate the certificates distributed in advance. But in contrast to IFAL, BCAM's DSVs depend not only on the certificates' validity periods 165 but also on the associated vehicles' IDs. A DSV for any vehicle cannot activate a certificate for any other vehicle, so the DSVs of the honest vehicles can be broadcast over insecure channels and cached by any device to facilitate their subsequent distribution. Also, while generating a separate DSV for each vehicle increases the computational and networking costs, the DSVs can be compressed using a hash tree.

Further, BCAM is designed to interoperate with the SCMS architecture, inheriting SCMS's ability to protect the privacy of honest users against a dishonest CA or any other non-colluding system entities. More particularly, the BCAM's DSVs are small pieces of information that are broadcast by a Certificate Access Manager (CAM). Each batch of certificates issued to a given vehicle is encrypted by CAM, and the decryption key can be computed by the vehicle from the DSV generated by the CAM from the vehicle's ID. Further, the DSVs of the honest vehicles can be compressed using the binary hash tree. If all the vehicles are honest, then CAM can broadcast only the tree's root to allow all the vehicles to decrypt the corresponding pseudonym certificates. A separate tree is created for each validity period. To revoke a misbehaving vehicle for a given validity period, the CAM will not transmit the tree nodes that would allow the misbehaving vehicle's DSV computation.

Compared to the original SCMS, BCAM creates a highly efficient revocation process, but also creates an extra point of collusion: CAM learns which batch of (encrypted) certificates belong to the same vehicle, so CAM can collude with the CA ("Pseudonym CA," or "PCA") to link those certificates together when they are used by the vehicle. In addition, in the certificate issuance process, the PCA encrypts the certificates to hide them from another SCMS entity (Registration Authority or RA), and then CAM encrypts the certificates again to prevent their activation without the DSV. This double encryption increases the computation costs and the network bandwidth utilization (due to the increased number of transmissions for doubly encrypting certificates versus a single encryption at the PCA).

In some embodiments, the two encryptions are replaced by one. Specifically, the CAM does not encrypt the certificate. Rather, CAM uses the DSV to generate a blinded activation code. The blinded activation code is used by the RA to generate encryption values given to the PCA to encrypt the certificate. The DSV will later be used to activate the certificate, i.e., the DSV will act as an (un-blinded) activation code. The DSV is thus a Device Specific Activation Code (DSAC). But the PCA does not know the DSV nor the blinded activation code, and the PCA cannot recover the DSV from the encryption values, nor link the different encryption values for a given vehicle to each other. On the other hand, CAM does not know the encryption values, and cannot link them to a vehicle or a DSV or a blinded activation code even if CAM and PCA collude. This scheme makes it harder for the PCA and CAM to link pseudonym certificates to a vehicle or to each other even if the PCA and CAM collude.

According to some embodiments, an Activation Codes for Pseudonym Certificates (ACPC) scheme can be employed. ACPC may introduce efficiency and security improvements over BCAM and IFAL. Compared with the C-ITS approach, or analogous solutions based on short-period certificate preloading, an advantage of ACPC is that activation codes for non-revoked vehicles are considered public information. Therefore, such activation codes can be openly broadcast and then cached anywhere (e.g., vehicles, websites, or mobile phones). For example, users may download activation codes overnight using their mobile phones, and then transfer those codes via a local connection (e.g., Bluetooth) to their own vehicles. Conversely, the periodical request of pseudonym certificates requires vehicles to have bidirectional connectivity for establishing a secure connection with VPKI authorities, using their enrollment certificates for (mutual) authentication.

Besides this added flexibility, ACPC's activation codes (e.g., 16 bytes) are usually much smaller than actual pseudonym certificates (e.g., 117-bytes, or larger ones based on post-quantum cryptography), and can be used for decrypting multiple certificates. Since a single activation code can be employed to decrypt multiple certificates, the bandwidth savings can be substantial in practice. Thus, they potentially lead to a more bandwidth-efficient solution. For example, in C-ITS, vehicles are expected to download pseudonym certificates covering a 3-month (i.e., 13-week) period, which translates to up to 1300 certificates. For typical 117-byte pseudonym certificates, this means a bandwidth overhead of 152 KB, which is almost 10,000 times larger than a 16-byte activation code in ACPC. Nevertheless, the broadcast model for distributing activation codes does not take full advantage of such smaller sizes. Indeed, ACPC assumes the distribution of an activation tree whose size is proportional to the number of revoked vehicles in the system. Even though this strategy has the benefit of allowing activation codes to be computed by any non-revoked vehicle, with a single broadcast, the size of the broadcast message may grow large if many revocations occur in the system.

Another way to address the potential growth of CRLs-which can be used in e.g., SCMS-comprises inserting "linkage values" in every pseudonym certificate, in such a manner that all certificates belonging to the same vehicle can be identified with a single CRL entry. This approach ensures that CRLs grow with the number of revoked vehicles, rather than with the number of revoked certificates, and preserves the privacy of non-revoked vehicles (as long as some care is taken in computing such linkage values). Nevertheless, such benefits come with potential drawbacks:

Low flexibility: Revoking a vehicle also means that its privacy is rescinded, since its entire set of pseudonym certificates can then be linked together. Thus, the only way to reinstate a revoked vehicle into the system is to re-provision that vehicle with new certificates. In other words, there is no "unrevoke" mechanism for situations like a vehicle being wrongly revoked, or in which the revocation occurred due to a temporary error that has been patched.

CRL growth: If vehicles are provisioned with certificates for y years, an entry may linger in the CRL for the same amount of time. For y=1 to 3, as in the original SCMS, this means that CRLs may actually grow big because each entry may have to be repeatedly distributed during a few years. This negatively affects both the distribution and storage costs of such CRLs.

Processing overhead: Additional processing is required on the vehicle-side to check whether a received certificate matches a CRL entry. Specifically, suppose that vehicles carry $\sigma$ pseudonym certificates that are simultaneously valid, and that $n_r$ vehicles are revoked. Then, to check a certificate's revocation status, vehicles need to perform $2 \cdot \sigma \cdot n_r$ encryptions (or hashes, if certain optimizations are employed). Alternatively, the vehicle can pre-compute one lookup table (LUT) containing $n_r \cdot \sigma$ entries for each certificate validity period, and then keep such a LUT in fast memory for speeding-up verifications. This is one reason why it is estimated that highly resource-constrained vehicles will be able to handle no more than 10,000 CRL entries, a number easily reached if vehicles are loaded with certificates for y=3 years and more than 3,333 misbehaving vehicles are revoked per year.

Such limitations of CRLs are among the main motivations for the solutions proposed in ACPC and C-ITS, which aim to reduce the need for CRLs in V2X environments.

According to embodiments of the present disclosure, systems and methods of the present disclosure are provided to, among other things, further address this bandwidth issue associated with CRLs. ACPC (and similar solutions based on activation trees) can benefit from a unicast distribution model. More precisely, if bidirectional connectivity is available, vehicles can considerably reduce their bandwidth usage when requesting activation codes. Three possible approaches are described herein and are compared with C-ITS and SCMS-based CRLs.

In the first approach, each vehicle makes a direct request (DR) for its own activation code, which leads to maximum bandwidth savings. Although the DR approach may reveal the vehicle's identity, this should not be an actual issue when the request is made toward system authorities. After all, this request still preserves the pseudonymity of the certificates subsequently activated; also, it is a common requirement for vehicles to identify themselves when interacting with authorities, while sensitive information that might be associated with the request, such as the vehicle's location, can be stripped from the messages via a location obscurer proxy (LOP). Nevertheless, such a momentary identification of vehicles may not be ideal when the requests are addressed toward cache units not managed by system authorities, in particular if the communication is made directly (e.g., via P2P, without any proxy).

For such cases, alternative approaches are proposed. The alternative approaches may balance between: (1) the fully anonymous reception of activation codes, via broadcast, which leads to potentially large bandwidth usage; and (2) the direct request of the desired activation code, which would be optimal in terms of bandwidth efficiency but allows the entity receiving the request (e.g., a caching unit) to identify the vehicle performing the request. Thus, in the second approach, each vehicle requests a small, fixed number of activation codes (Fixed-Size Subset (FSS)), preserving its privacy by mixing itself among the many vehicles that could make that request. In the third approach, each vehicle requests a variable number of activation codes (Variable-Size Subset (VSS)), aiming to reach a target privacy threshold.

Since all three approaches—DR, FSS, VSS—can prevent vehicle tracking like in the broadcast model, they are of practical interest, in particular considering the bandwidth savings and higher flexibility when compared with the periodical renewal of certificates (e.g., in C-ITS). These approaches can be considered and employed for VPKI where activation codes are used (e.g., ACPC).

Security Credential Management System (SCMS)

Security Credential Management System (SCMS) is a vehicular public-key infrastructure (VPKI) design for protecting V2X—vehicle-to-vehicle (V2V) and vehicle-to-infrastructure (V2I)—communications. SCMS is described in further detail in Whyte et al., "A security credential management system for V2V communications," in IEEE Vehicular Networking Conference, 2013, pp. 1-8, and CAMP LLC, "Security Credential Management System Proof-of-Concept Implementation—EE Requirements and Specifications Supporting SCMS Software Release 1.1," May 2016; available at https://www.its.dot.gov/pilots/pdf/SCMS_POC_EE_Requirements.pdf, both of which are incorporated herein by reference. SCMS deals with revocable privacy while preventing any given certificate management entity from tracking devices 110/150 by the entity itself, i.e., without colluding with other system entities. By doing so, SCMS copes with the security needs of V2X while elegantly addressing a threat model in which the system's entities can be considered "honest-but-curious," i.e., they follow the correct protocols but may try to track vehicles if this can be done in an undetectable manner, as described in Khodaei et al., "The key to intelligent transportation: Identity and credential management in vehicular communication systems," *IEEE Vehicular Technology Magazine*, vol. 10, no. 4, pp. 63-69, December 2015, which is incorporated by reference. This is accomplished by combining (A) an efficient and privacy-preserving method for vehicles to obtain large batches of pseudonym certificates, and (B) an ancillary process for revoking the user's privacy in case of misbehavior, so multiple certificates belonging to the same user can be easily linked together.

General Notation

For convenience, the "Symbols" Table below includes a list of the symbols and general notation adopted in this disclosure for the relevant environment including V2X, connected vehicle, and/or SCMS.

TABLE

Symbols

| Symbol | Meaning |
| --- | --- |
| U | A vehicle's public key, different for each pseudonym certificate, and used as a pseudonym, placed in pseudonym a certificate |
| u | The private key corresponding to U |
| s, S | Private and public caterpillar keys for signature |
| e, E | Private and public caterpillar keys for encryption |
| ŝ, Ŝ | Private and public cocoon keys for signature |
| ê, Ê | Private and public cocoon keys for encryption |
| x, X | Private and public unified caterpillar keys |
| x̂, X̂ | Private and public unified cocoon keys |
| β | Number of cocoon keys in a batch of pseudonym certificates generated in response to a request to generate the pseudonym certificates |
| la_id | ID of a Linkage Authority |
| l | Number of LAs (typically two) |
| $ls_i$ | Linkage seed |
| $plv_i$ | Pre-linkage value |
| σ | Number of certificates valid in each time-period |
| lv | Linkage value |
| Dec(K, str) | Decryption of bitstring str with key K |
| Sign(K, str) | Signature of bitstring str with key K |
| Verif(K, str) | Verification of signature on str with key K |
| Enc(key, str) | Encryption of a bit string str with key |
| Hash(str) | Hash of str |
| $b^n$ | Bitstring corresponding to the bit b repeated n times |
| \|str\| | The length of str, in bits |
| $str_1 \| \| str_2$ | Concatenation of bitstrings $str_1$ and $str_2$ |

The notation enc(key, str) denotes the encryption of a bit string str with key. An example encryption technique uses standard block ciphers such as the Advanced Encryption Standard (AES), as described in more detail in NIST, *Federal Information Processing Standard (FIPS 197)—Advanced Encryption Standard (AES)*, National Institute of Standards and Technology, U.S. Department of Commerce, Gaithersburg, MD, USA, November 2001, available: http://csrc.nist.gov/publications/fips/fips197/fips-197.pdf. Similarly, the notation hash(str) denotes the hash of str, using some standard hash function such as SHA-2 or SHA-3, as described in more detail in NIST, *Federal Information Processing Standard (FIPS 180-4)—Secure Hash Standard (SHS)*, National Institute of Standards and Technology, U.S. Department of Commerce, Gaithersburg, MD, USA, August 2015, DOI:10.6028/NIST.FIPS.180-4, and NIST, *Federal Information Processing Standard (FIPS 202)—SHA-3 Standard: Permutation-Based Hash and Extendable-Output Functions*, National Institute of Standards and Technology, U.S. Department of Commerce, Gaithersburg, MD, USA, August 2015, DOI: 10.6028/NIST.FIPS.202, both of which are incorporated by reference herein.

The length of a given string str in bytes is denoted \|str\|. The generator point of an elliptic curve group (written additively) is denoted by G. In some public-key cryptographic algorithms, the private key is an integer k, and the corresponding private key is k·G, as common in cryptosystems based on the Diffie-Hellman paradigm.

In SCMS, each device (110/150) receives two types of certificates: an enrollment certificate 160, which has a long expiration time T and identifies a valid device in the system; and multiple pseudonym certificates 160p, each having a short validity (e.g., a few days), in such a manner that σ≥1 pseudonym certificates may be valid simultaneously. For protecting its privacy, a particular vehicle may frequently change the pseudonym certificate employed in the vehicle's communications, thus avoiding tracking by nearby vehicles or by roadside units. In practice, it is useful to limit the value of σ to a small number to avoid "sybil-like" attacks (as described in detail in Douceur, "The Sybil attack," *Proceedings of 1st International Workshop on Peer-to-Peer Systems (IPTPS)*. Springer, January 2002 (Available: https://www.microsoft.com/en-us/research/publication/the-sybil-attack/), which is incorporated herein by reference), in which one vehicle poses as a platoon aiming to gain some advantage over the system (see Moalla et al., "Risk analysis study of ITS communication architecture," 3*rd International Conference and The Network of the Future*, 2012, pp. 2036-2040, which is incorporated herein by reference). For example, such a fake platoon could end up receiving preferential treatment from traffic lights programmed to give higher priority to congested roads.

Example SCMS Architecture

Figure 6:
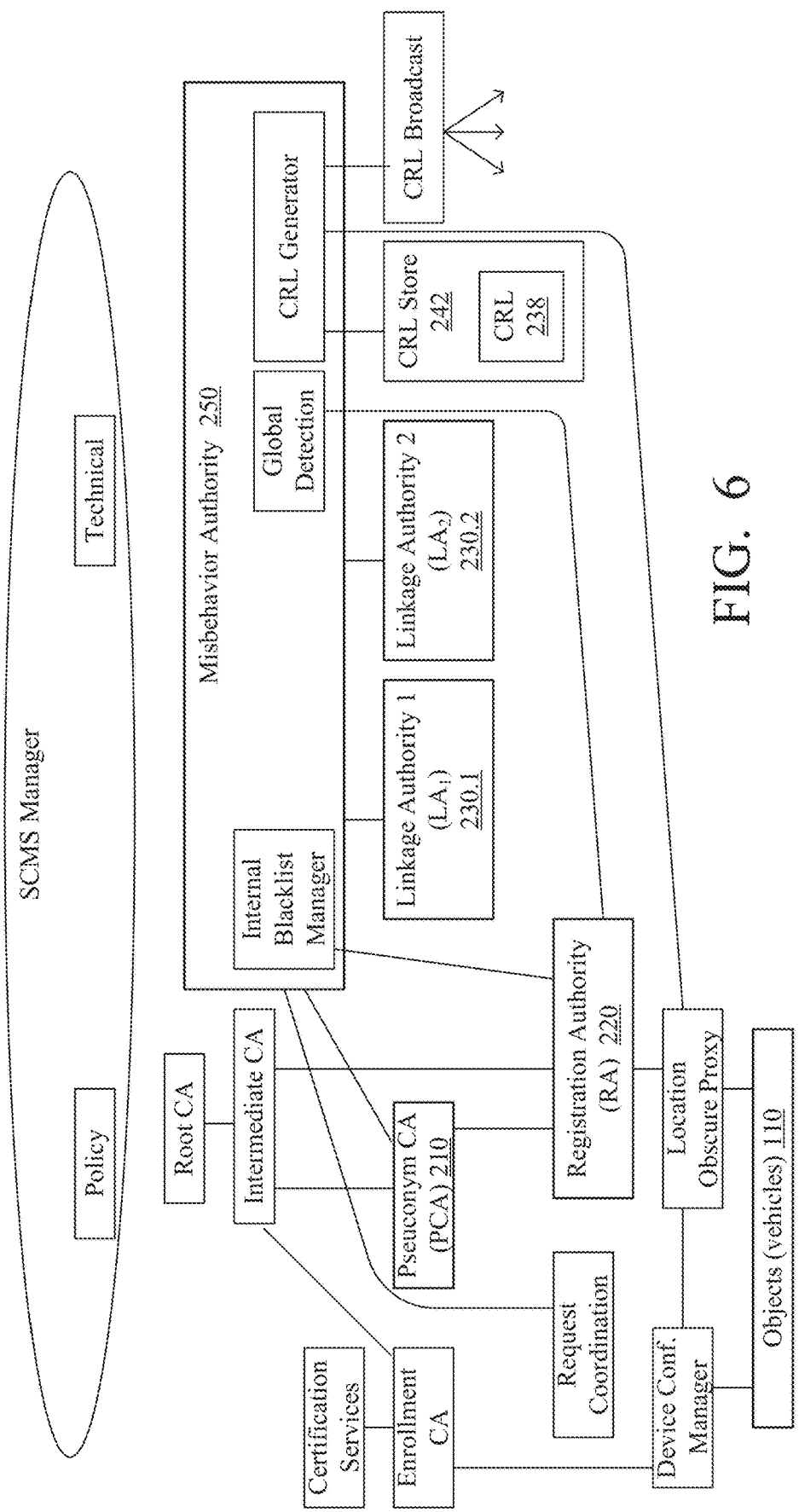
FIG. 6 is a block diagram illustrating a computer system architecture for digital certificate management, according to some embodiments.

FIG. 6 illustrates an exemplary computer system architecture environment for SCMS. SCMS was designed to allow the distribution of multiple pseudonym certificates to vehicles in an efficient manner while providing mechanisms for easily revoking them in case of misbehavior by their owners.

In SCMS, a Registration Authority (RA) 220 provides batches of pseudonym certificates 160p to authorized vehicles or objects 110/150. A batch is generated from a single request received from a vehicle, in the butterfly key expansion process. RA 220 validates the vehicle requests by the vehicles' enrollment certificates 160. In addition to an enrollment certificate, each request includes some public keys (other than 164) generated by the vehicle for the pseudonym certificate provisioning process. These public keys are labeled as 710 in FIG. 7 discussed below. RA 220 then shuffles together the keys 710 belonging to different users before individually sending them to a Pseudonym Certificate Authority (PCA) 210. As such, the PCA 210 cannot link a group of requests to a same object 110/device 150. The PCA 210, in turn, creates valid certificates 160p, and encrypts and signs them before delivering them to the RA for forwarding to the devices 110/150. Since the certificates 160p are encrypted, the RA cannot link a pseudonym certificate 160p to a device 110/150. Unless the PCA and RA collude, they are unable to link a certificate 160p to its owner 110/150.

Linkage Authority (LA) 230, or rather linkage authorities $LA_1$ and $LA_2$—also labeled as 230.1 and 230.2—generate random-like bitstrings that are combined to create a linkage value (lv 234 in FIGS. 5A, 5B) added to pseudonym certificates 160p so that the pseudonym certificates can be efficiently revoked. The lv values are different for different pseudonym certificates, but they can be linked together for a given enrollment certificate 160. See e.g., U.S. patent application No. 62/561,667, filed 21 Sep. 2017, incorporated herein by reference; U.S. patent application Ser. No. 16/136,621, filed 20 Sep. 2018, incorporated herein by reference; and Marcos A. Simplicio Jr. et al., "A privacy-preserving method for temporarily linking/revoking pseudonym certificates in vehicular networks," https://eprint.iacr.org/2018/185.pdf, 2018, incorporated herein by reference.

Misbehavior Authority (MA) 250 obtains a misbehaving device's certificate 160*p* and uses the certificate's lv 234 and data obtained from the RA and PCA to revoke all of the same device's certificates 160*p*.

In some embodiments, each of RA 220, PCA 210, LAs 230, and MA 250 can be implemented with or incorporate one or more computing devices (e.g., computing device 150 or computer systems 316).

Butterfly Key Expansion

Figure 7:
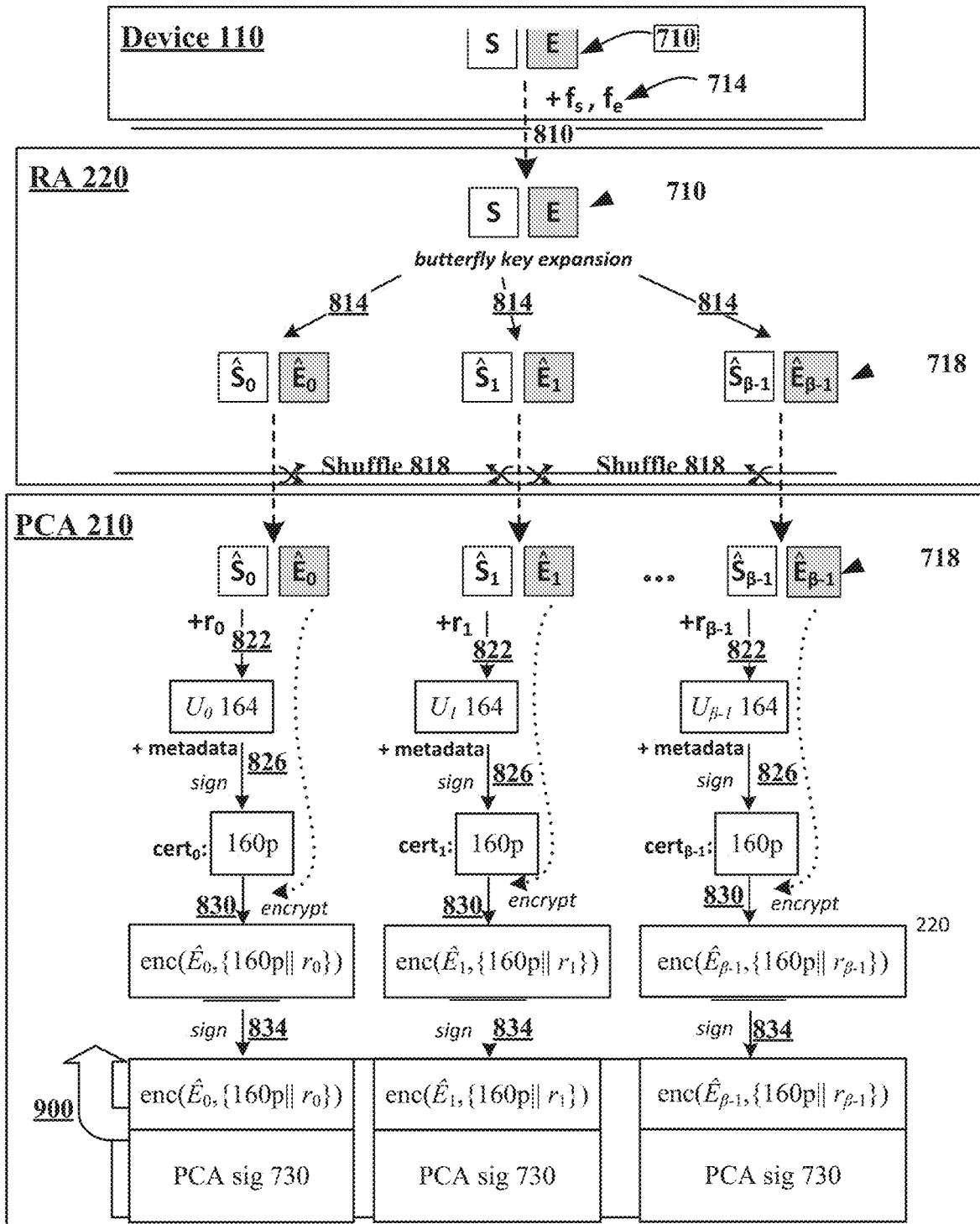
FIGS. 7 and 8 are flowcharts that illustrate processes for generating digital certificates.

The pseudonym certification provisioning process in SMCS provides an efficient mechanism for devices 110 to obtain arbitrarily large batches of (short-lived) certificates 160*p* with a small-sized request message. The process is illustrated in FIG. 7. First, the requesting device 110/150 generates two "caterpillar" private/public key pairs 710:

$$(s, S = s \cdot G) \text{ and } (e, E = e \cdot G)$$

The private keys s and e should be random. The keys are generated using elliptic curve cryptography. The keys (s, S) relate to the generation of pseudonyms 164 (FIGS. 5A, 5B), and are called "signature keys" because the pseudonyms 164 are used for message authentication via signature verification as described above. The keys (e, E) relate to pseudonym certificate encryption performed to hide the pseudonyms from the RA as described below; these keys are called "encryption keys".

At step 810, the device 110 requests the RA to generate some predefined number β of pseudonym certificates 160*p*. The request sent to the RA includes the public caterpillar keys S and E, shown at 710. In addition to keys 710, the request includes data defining two suitable pseudorandom functions (PRF) 714, denoted $f_s$ and $f_e$. (In some embodiments, the function-defining data may be the seeds of these functions; the functions' outputs can be computed from the seeds. Alternatively, while less efficient, the function-defining data may include the entire description of the PRFs, including the description of the computational algorithms for the PRFs.)

The RA may receive such requests from different devices 110, and obtains β pseudonym certificates 160*p* for each device as follows. For each request, the corresponding keys S and E are employed by the RA, at step 814, for generating public cocoon keys 718. Specifically, at step 814, the key S is used in the generation of β public cocoon signature keys:

$$\hat{S}_i = S + f_s(i) \cdot G$$

for all i such that $0 \leq i < \beta$. Similarly, at the same step 814, the RA uses the key E for generating β public cocoon encryption keys:

$$\hat{E}_i = E + f_e(i) \cdot G$$

Pairs of cocoon keys 718, i.e., ($\hat{S}_i$, $\hat{E}_i$), from different devices 110 are then shuffled together by RA 220 (step 818) and sent individually or in batch to PCA 210 for the generation of the corresponding pseudonym certificates 160*p*. Each pair of cocoon keys is accompanied by the corresponding metadata, such as validity period 165 and data required for computation of linkage value (lv) 234; see FIGS. 4, 5A, 5B.

Figure 8:
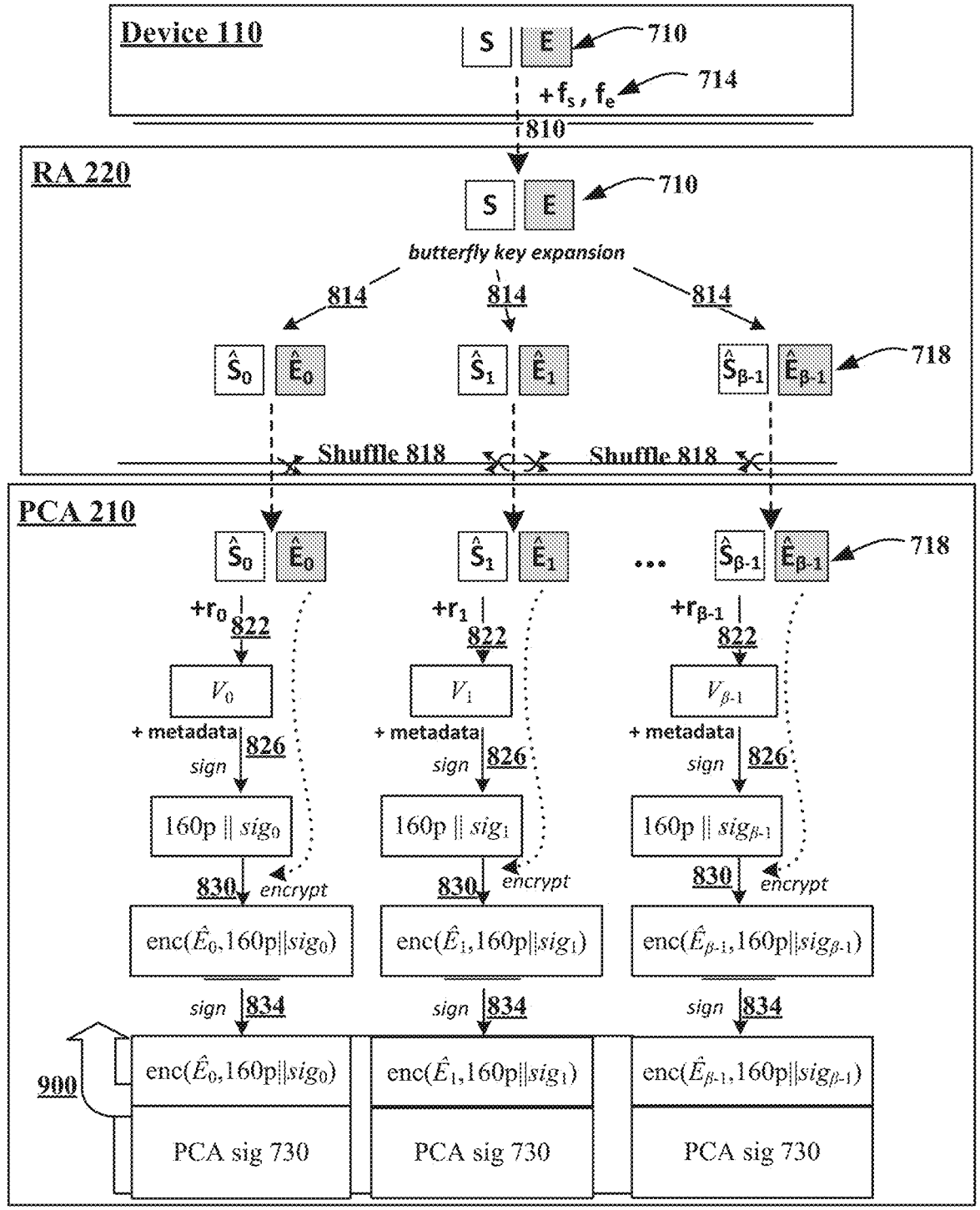

For each pair of cocoon keys ($\hat{S}_i$, $\hat{E}_i$), the PCA can either create an explicit pseudonym certificate 160*p* (FIG. 5A) using the method of FIG. 7, or engage in an implicit certification process (FIG. 5B and Certicom) as illustrated in FIG. 8. The explicit or implicit certificate 160*p* is encrypted by the PCA and sent to the RA (step 900 in FIGS. 7, 8)). The RA "un-shuffles" the pseudonym certificates, and sends each pseudonym certificate to the corresponding (associated) device 110. Each device's β pseudonym certificates are sent to the device in batch.

For the explicit process (FIGS. 5A, 7), the PCA computes, at step 822, a random value $r_i$ and generates the certificate's public signature key (pseudonym) 164 according to the following equation (Eq. 1):

$$U_i = \hat{S}_i + r_i \cdot G \tag{Eq. 1}$$

At step 826, the PCA forms the certificate 160*p*, also shown as $cert_i$, by: (1) combining $U_i$ with the metadata, e.g., the certificate's validity period 165 and the linkage value (lv) 234; and (2) digitally signing the combination to form the signature 167 (FIG. 5A).

The PCA then encrypts the certificate 160*p* together with the value of $r_i$, using the corresponding cocoon key $\hat{E}_i$ (step 830). The encrypted package (certificate 160*p* and value $r_i$) is signed again by the PCA (step 834) using the PCA's private signature key. The signature is shown at 730.

The result, i.e., the encrypted and signed package, is sent to the RA (step 900). The RA forwards the result to the requesting device 110.

Only the requesting device 110 can decrypt the value:

$$enc(\hat{E}_i, 160p \| r_i)$$

(see step 834) because only the requesting device 110 knows the private key corresponding to the cocoon key $\hat{E}_i$. This private key is given by the following equation (Eq. 2):

$$\hat{e}_i = e + f_e(i) \tag{Eq. 2}$$

Therefore, only the device 110 can learn the pseudonym $U_i$ (as part of certificate 160*p*) and compute the corresponding private signature key:

$$u_i = s + r_i + f_s(i) \tag{Eq. 3}$$

The device 110 can also verify the signature keys $u_i$, $U_i$ by checking that:

$$U_i = u_i \cdot G \tag{Eq. 4}$$

Device 110 also verifies the PCA signature 730 to prevent the Man-in-the-Middle attack by the RA as described below.

For implicit certificates 160*p*, this process is as follows (see FIG. 8). The cocoon key generation (steps 810, 814, 818) is the same as for the explicit certificates. Then at step 822, the PCA computes a random $r_i$, and computes the credential 164:

$$V_i = \hat{S}_i + r_i \cdot G \tag{Eq. 5}$$

Then at step 826, the PCA creates the implicit certificate 160*p*, also denoted $cert_i$, as:

$$cert_i = (V_i, meta)$$

i.e., $$cert_i = V_i \| meta$$

where "meta" is the metadata (including validity period 165 etc.).

Also at step 826, the PCA signs this certificate to obtain the signature $sig_i$ as follows:

$$sig_i = h_i \cdot r_i + u_{PCA} \tag{Eq. 6}$$

where $h_i = Hash(cert_i)$, and $u_{PCA}$ is the PCA's private signature key.

The remaining steps of the certificate generation are similar to FIG. 7. Specifically, the PCA encrypts the certificate 160*p* together with the signature value of $sig_i$, using the corresponding cocoon key $\hat{E}_i$ (step 830). The encrypted package (certificate 160*p* and value $sig_i$) is signed by the PCA (step 834) using the PCA's private signature key. The signature is shown at 730. At step 900, the result (the encrypted structure and the signature 730) is sent to the requesting device 110 via the RA 220.

The device 110 verifies the PCA signature 730, decrypts the package $cert_i \| sig_i$, and computes:

$$h_i = \text{Hash}(cert_i) \quad \text{(Eq. 7)}$$

Device 110 then sets its own private signature key to:

$$u_i = h_i \cdot (s + f_s(i)) + sig_i \quad \text{(Eq. 8)}$$

whereas the corresponding public signature key takes the form:

$$U_i = u_i \cdot G \quad \text{(Eq. 9)}$$

The device 110 can then verify the validity of the public key $U_i$ by ascertaining that $$U_i = h_i \cdot V_i + U_{PCA} \quad \text{(Eq. 10)}$$

where $U_{PCA}$ is the PCA's public signature key corresponding to $u_{PCA}$.

Whichever certificate model is adopted, at step 834 of FIGS. 7 and 8, the encrypted PCA response is signed using the PCA's own private signature key $u_{PCA}$, aiming to prevent an "honest-but-curious" RA from engaging in a Man-in-the-Middle (MitM) attack. Namely, without this signature 730, a MitM attack by the RA could be performed as follows: (1) instead of $\hat{E}_i$, the RA sends to the PCA, at step 818, a fake cocoon encryption key $\hat{E}_i^* = z \cdot G$, for an arbitrary value of z; (2) at step 900, the RA decrypts the PCA's response using z, learning the pseudonym $U_i$ (FIG. 7) or $V_i$ (FIG. 8); and (3) the RA re-encrypts the certificate with the correct $\hat{E}_i$, sending the result to the device, which proceeds with the protocol as usual. But if the PCA generates signature 730 and device 110 verifies the signature 730 on the RA's response, the attack would fail because the RA cannot provide a valid signature 730 for the re-encrypted certificate generated in step (3).

Independently of the type of certificate adopted (explicit or implicit), the user's privacy is protected in this process as long as the RA and PCA do not collude. After all, the shuffling of public cocoon keys performed by the RA (step 818) prevents the PCA from learning whether or not any keys 718 belong to the same device. Unlinkability of public keys $U_i$ (FIG. 7) or $V_i$ (FIG. 8) to the devices for the RA, in turn, is also obtained because the latter does not learn the value of $U_i$ or $V_i$ randomized by the PCA using $r_i$.

Key Linkage

To avoid large certificate revocation lists (CRLs), in some embodiments, revocation can be done in such a manner that many certificates 160p from the same user can be linked together by inserting only a small amount of information into a CRL. For this purpose, each certificate 160p (FIGS. 4, 5A-B) receives a linkage value lv 234, computed by XOR-ing l prelinkage values $plv_i$ (where $1 \leq i \leq l$) provided by $l \geq 2$ different Linkage Authorities (LA). The generation of $plv_i$ by $LA_i$ is done upon request by the RA, as follows.

Figure 9:
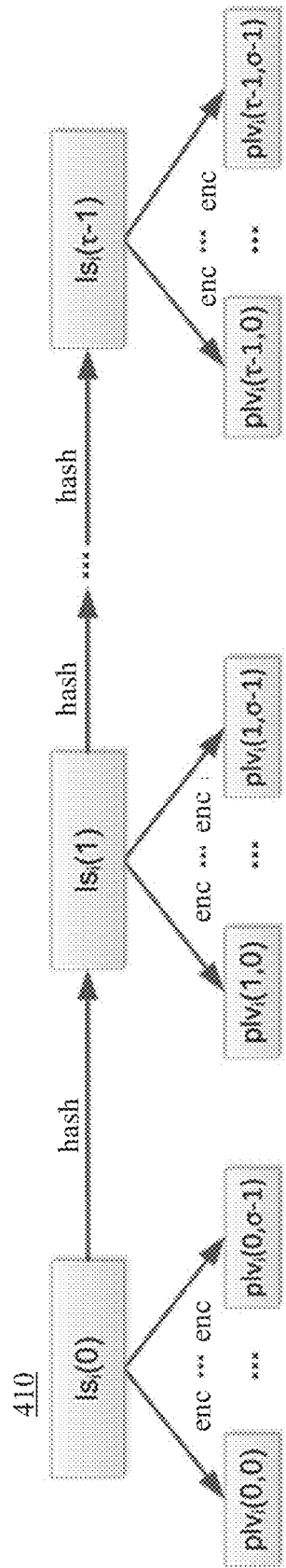
FIG. 9 illustrates a data structure used in certificate revocation schemes.

First, as illustrated in FIG. 9, $LA_i$ picks a random, 128-bit linkage seed $ls_i(0)$. Then, if the RA's request covers τ certificate time-periods, $LA_i$ iteratively computes a τ-long hash chain $ls_i(t) = \text{Hash}(la\_id_i \| ls_i(t-1))$, where $la\_id_i$ is $LA_i$'s identity string and $1 \leq t \leq \tau$. See L. Lamport, "Password authentication with insecure communication," Commun. ACM, vol. 24, no. 11, pp. 770-772, 1981, incorporated herein by reference. Each $ls_i(t)$ is then used in the computation of a σ pre-linkage values $plv_i(t,c) = \text{Enc}(ls_i(t), la\_id_i \| c)$, for $0 \leq c < \sigma$. In the CAMP reference cited above, the encryption is actually done using the Davies-Meyer construction; see B. Preneel, Davies-Meyer Hash Function. Boston, MA: Springer US, 2005, pp. 136-136, incorporated herein by reference. In particular, the cipher's input is XORed with the ciphertext produced as output. However, since this small difference is not relevant for our discussion, we omit the extra XOR in our notation. Finally, every $plv_i(t,c)$ is truncated to a suitable length, individually encrypted and authenticated using a key shared between the PCA and $LA_i$, and then sent to the RA. Even though authentication is not explicitly mentioned in Whyte et al., "A security credential management system for V2V communications," and CAMP, both cited above, authentication is important to prevent the RA from forging its own pre-linkage values and delivering them to the PCA as if they came from LAi, which would allow a dishonest RA to track devices. The RA simply includes this encrypted information, together with the corresponding cocoon keys, in the requests sent to the PCA, so the latter can compute the linkage values to be included in the resulting certificates. In the usual case, which consists of two LAs participating in this process, the linkage value for the c-th certificate valid in time-period t is computed as $lv(t,c) = plv_1(t,c) \oplus plv_2(t,c)$.

As a result of this process, whenever a device is identified as malicious by a Misbehavior Authority (MA), certificates still valid owned by that device can be revoked not only individually, but also altogether. This is accomplished via the collaboration of the PCA, RA, and LAs. Namely, the PCA can associate the lv informed by the MA to the original pseudonym certificate request received from the RA. The PCA then provides this information, together with the corresponding pre-linkage values $plv_i(t,c)$, to the RA. The RA, in turn, can (1) identify the device behind that certificate request, placing its enrollment certificate in a blacklist for preventing it from obtaining new pseudonym certificates, and (2) ask $LA_i$ to identify the linkage seed $ls_i(0)$ from which $plv_i(t,c)$ was computed. Finally, each $LA_i$ provides RA with $ls_i(t_s)$, where $t_s$ is the time-period from which the revocation starts being valid (usually, the current time-period or the one in which the misbehavior was first detected). The set of $ls_i(t_s)$ received from the LAs can then be placed in a CRL to be distributed throughout the system, allowing any entity to compute $lv(t,c)$ for time-periods $t \geq t_s$, linking the corresponding certificates to a single CRL entry. Consequently, current and future certificates owned by the misbehaving device are revoked and can be linked to that device; past certificates remain protected, though, preserving the device's privacy prior to the detection of the malicious activity.

In terms of complexity, this revocation process is such that, if the system involves l linkage authorities 230, each revoked device contributes with l pre-linkage values to the CRL. Hence, the CRL size grows linearly with the number of revoked devices, not with the number of revoked certificates. The main drawback of this gain in size is that checking whether a given certificate is in the CRL requires the verification of every CRL entry against that certificate's linkage value. More precisely, for each CRL entry published at time-period $t_s$, the verification of whether it covers a given certificate involves basically the computation of two components:

a) $ls_i(t_c)$: it takes $1 \cdot (t_c - t_s)$ hashes to compute $ls_i(t_c)$ from $ls_i(t_s)$, where $1 \leq i \leq l$ and $t_c$ is the time-period when the verification is performed. This cost may be reduced by means of pre-computation, i.e., if the device always keeps the updated version of the linkage seeds, $ls_i(t_c)$, besides the original ones provided in the CRL. Nevertheless, to cope with the lack of a system-wide time synchronization (see Verheul reference), devices may actually need to keep a slightly older linkage seed in memory; for example, by keeping $ls_i(t_c-\in)$ for a small $\in$, it is possible to compute $ls_i(t_c)$ with only $\in$ hashes.

b) $plv_i(t_c,c)$: it takes 1 encryptions to compute $plv_i(t_c,c)$ from $ls_i(t_c)$ if the value of c for the certificate under verification is known; this is the case, for example, if the value of c is part of that certificate's metadata. Otherwise, the total cost would be up to 1·σ encryptions, since the certificate under analysis may be any out of σ that are valid in the current time-period; with enough memory, however, the latency of this process can be reduced via the pre-computation of a look-up table with all σ possible entries for each $ls_i(t_c)$ in the CRL. On the one hand, besides providing better performance, the first approach facilitates the construction of solutions resilient to the aforementioned sybil-like attacks; this can be accomplished by counting as valid only messages signed with certificates for a fixed value of c. On the other hand, this ability may also be abused to allow vehicle tracking if one or several applications decide to only accept a specific c; meanwhile, a bit of privacy is lost because different certificates known to have the same value for σ are also deemed to belong to different vehicles. Therefore, mandating the disclosure of c in pseudonym certificates may become controversial and, in practice, it would probably be avoided in favor of look-up tables.

All in all, to reduce the costs related to the revocation verification, it is important to limit the total number of entries in the CRLs. Unfortunately, however, since each CRL entry covers τ time-periods, they may have to remain in the CRL for quite a long time. To address this issue, some embodiments described herein prevent revoked vehicles' certificates from being activated, so the corresponding entries on the CRL can be removed earlier.

Unified Butterfly Key Expansion Process (eSCMS)

Some embodiments of the present disclosure can be used with another system, called eSCMS, that improves the pseudonym provisioning process by unifying the generation of butterfly keys for encryption and signature. eSCMS is described in U.S. patent application Ser. No. 16/165,871, filed 19 Oct. 2018, incorporated herein by reference.

The butterfly key expansion (step 814) originally described in Whyte et al., "A security credential management system for V2V communications," cited above, is executed twice by the RA during the pseudonym certification provisioning process: once for the generation of the public signature keys and another for encryption keys. As a result, the device itself needs to send to the RA two caterpillar keys (S and E), as well as the corresponding PRFs ($f_s$ and $f_e$), for the computation of the corresponding cocoon keys ($\hat{S}_i$ and $\hat{E}_i$, where $0 \leq i < \beta$). In addition, since SL and E are seen as independent keys by the PCA when issuing a certificate, the PCA needs not only to encrypt the certificate but also sign the resulting encrypted package to avoid manipulation by the RA. Even if an efficient signcryption algorithm is employed for this purpose—see e.g., Y. Zheng, "Digital signcryption or how to achieve cost (signature & encryption)<<cost(signature)+cost(encryption)," in Advances in Cryptology—CRYPTO '97: 17th Annual International Cryptology Conference. Berlin, Heidelberg: Springer Berlin Heidelberg, 1997, pp. 165-179, incorporated herein by reference—the extra signature leads to additional overheads: on the PCA, for the computation and transmission of such signature; on the RA, for its reception and re-transmission; and on the end devices, for its reception and verification, besides the verification of the certificate's signature itself.

It turns out, however, that the generation and usage of encryption and signature keys can be done in a unified manner. This leads to better efficiency in terms of processing and bandwidth usage, without loss of security or functionality. This alternate process is part of eSCMS.

In eSCMS (FIGS. 10A, 10B, 11A, 11B), the generation and usage of the caterpillar keys 710 is done in a unified manner, leading to better efficiency without loss of security or functionality. Specifically, in some embodiments, the device 110 generates only one caterpillar key pair, (x,X) in FIGS. 10AB and 11A-B, instead of two key pairs (e,E) and (s,S). This caterpillar key pair (x,X) can have the same size as any one of (e,E) and (s,S), and is used to generate both the encryption and signature keys. Both the explicit and the implicit certificate models are eSCMS compatible.

Explicit Certificate Process

Figure 10A:
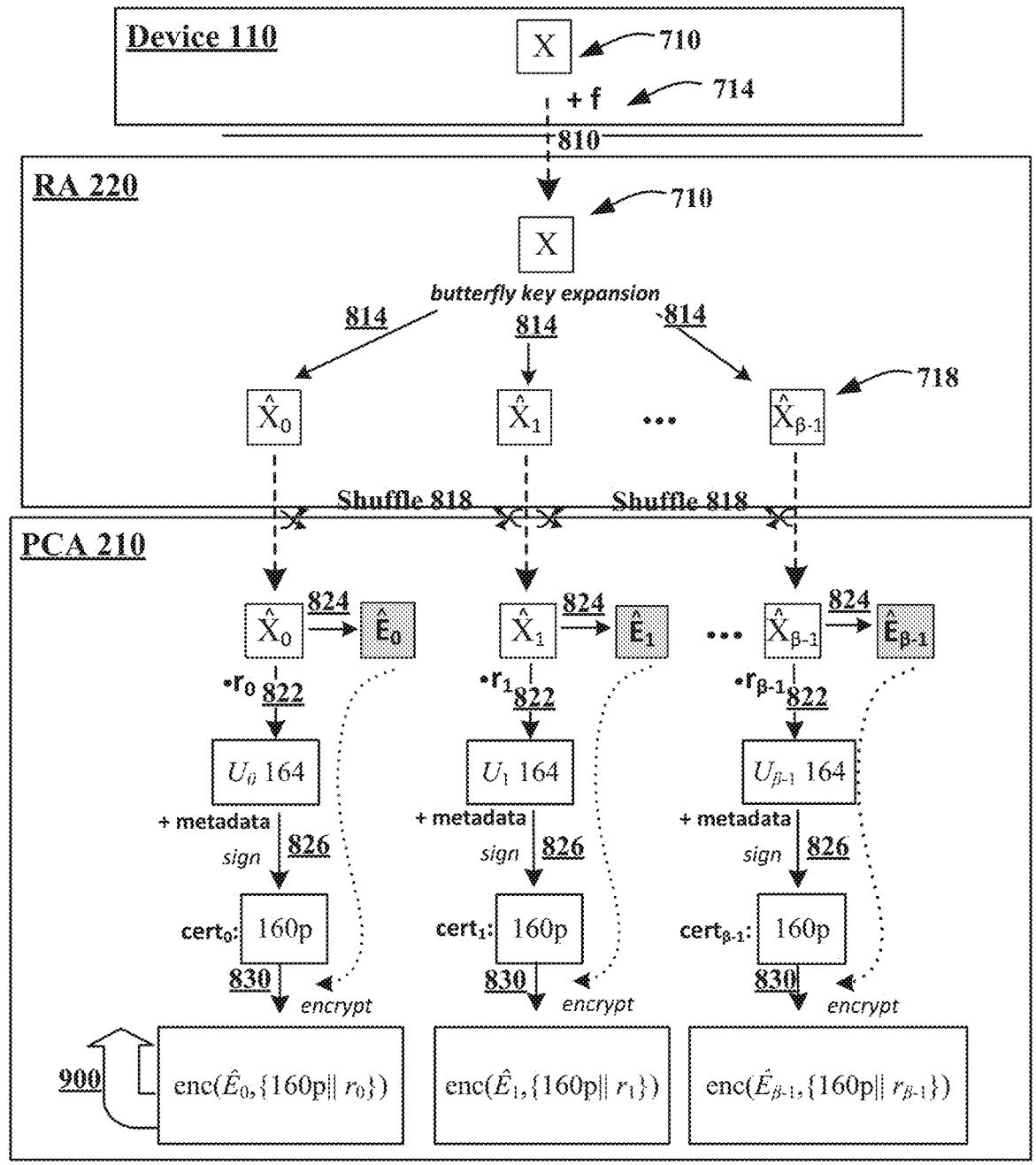
FIGS. 10A, 10B, 11A, 11B are flowcharts illustrating certificate issuance techniques used in some embodiments.
Figure 10B:
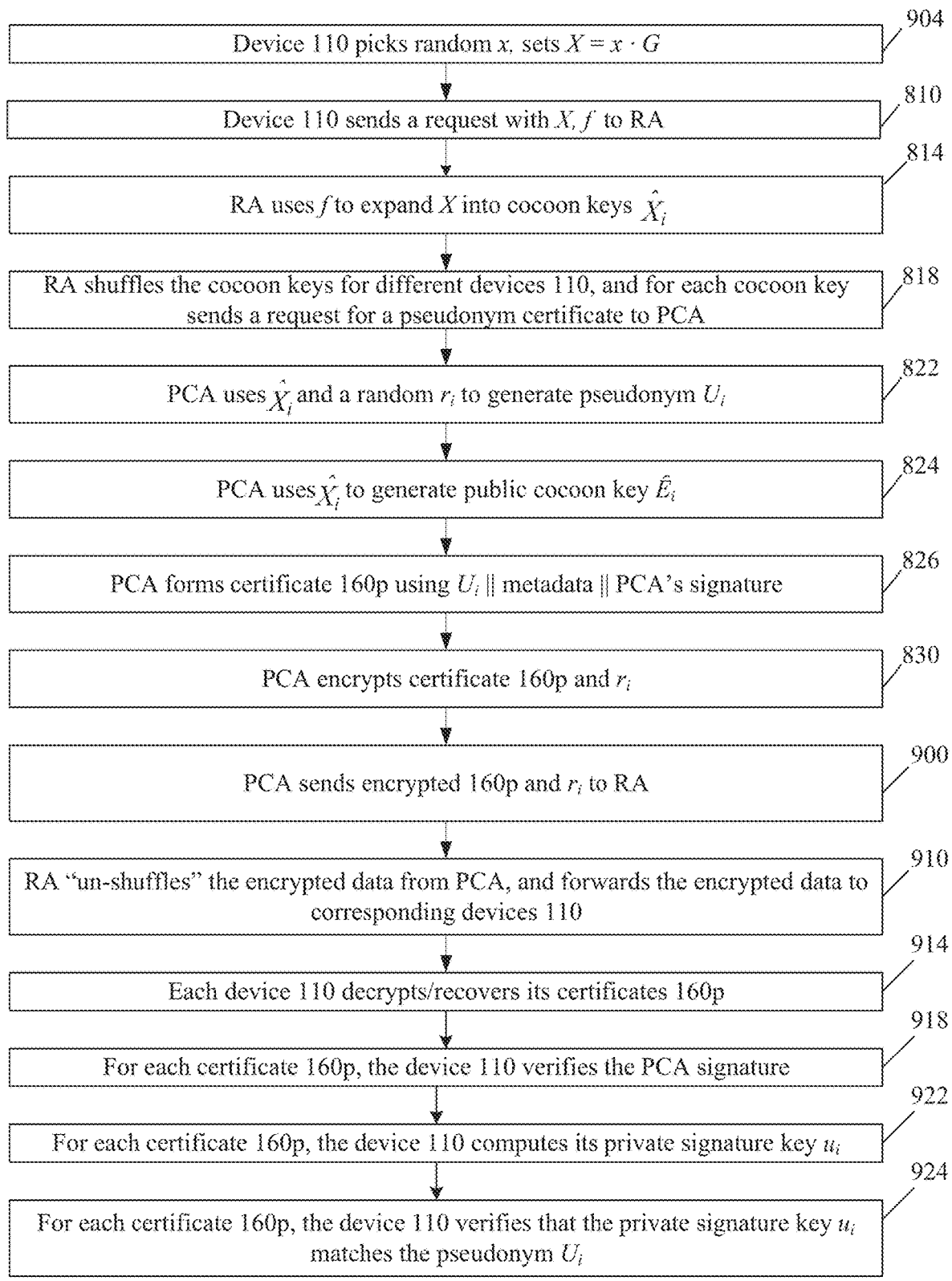

An example embodiment of an explicit certificate scheme—that can, for example, be used in eSCMS—is depicted in FIGS. 10A-B. At step 904, the requesting device 110 generates only a single caterpillar private/public key pair 710: (x, X=x·G). The private key x can be randomly generated. The public key X will be used by the PCA both for encrypting the certificate 160*p* and for creating the public key or pseudonym 164 for the certificate as described below (step 824).

At step 810, the device 110 requests the RA to generate some predefined number β of pseudonym certificates 160*p*. The device request sent by the device to the RA includes a unique ID ("device request ID"), a unique device ID (e.g., VID), the public unified caterpillar key X, and data defining a suitable pseudorandom function (PRF) 714, shown simply as $f$. The function $f$ can be the same as $f_s$ or $f_e$ in SCMS. A copy of each device request is stored by the device in its memory.

At step 814, the RA generates β public unified cocoon signature keys for each device (similarly to SCMS):

$$\hat{X}_i = X + f(i) \cdot G \quad \text{(Eq. 11)}$$

At step 818, the RA shuffles these cocoon keys for different devices, and for each cocoon key $\hat{X}_i$ the RA sends a request ("RA request") for a pseudonym certificate 160*p* to PCA 210. The RA requests for different devices 110 can be sent to the PCA in batch, but this is not necessary.

For each RA request, the RA generates a unique request ID ("RA request ID"), and creates a data structure ("RA request data structure") containing the RA request ID, the cocoon key index i (see equation (Eq. 11)), and the associated device request. The RA request ID is provided to the PCA with the RA request. Also provided are metadata, e.g., the certificate's validity period 165 and the linkage value (lv) 234. The device ID is not provided to the PCA, so the PCA cannot associate the RA request with the device. Also, the PCA cannot determine whether different RA requests are associated with the same or different devices.

For each cocoon key $\hat{X}_i$, the PCA can either create an explicit or implicit pseudonym certificate 160*p*. FIGS. 10A-B illustrate a process for explicit certificates. In either case, the explicit or implicit certificate 160*p* will later be encrypted by the PCA and sent to the RA (step 900). Each encrypted pseudonym certificate will be accompanied by the RA request ID, allowing the RA to "un-shuffle" the pseudonym certificates, i.e., associate each encrypted package with the device, and send the encrypted package to the associated device. Optionally, each device's β pseudonym certificates can be sent to the device in batch.

For the explicit certificates, at step 822, the PCA generates a random value $r_i$, and generates the certificate's public signature key (pseudonym) 164 as a randomized function of cocoon key $\hat{X}_i$, i.e., as a function of $\hat{X}_i$ and $r_i$. For example, either one of the following equations (Eq. 12), (Eq. 12') can be used:

$$U_i = \hat{X}_i + r_i \cdot G \quad \text{(Eq. 12)}$$

$$U_i = r_i \cdot \hat{X}_i \quad \text{(Eq. 12')}$$

Also (step 824), the PCA generates a public cocoon encryption key $\hat{E}_i$. In some embodiments, $\hat{E}_i$ is set equal to $\hat{X}_i$, i.e.

$$\hat{E}_i = \hat{X}_i \quad \text{(Eq. 13)}$$

Other expressions for $\hat{E}_i$ can also be used. For example:

$$\hat{E}_i = \text{hash}(\hat{X}_i) \cdot G + \hat{X}_i \quad \text{(Eq. 13')}$$

The remaining steps may or may not be similar to FIG. 7, but the generation of the PCA signature 730 can be omitted. Specifically, in some embodiments, at step 826, the PCA forms the certificate 160*p*, also shown as cert$_i$, by: (1) combining $U_i$ with the metadata, e.g., the certificate's validity period 165 and the linkage value (lv) 234; and (2) digitally signing the combination to form the signature 167 (FIG. 5A).

At step 830, the PCA encrypts the package which includes (possibly consists of) the certificate 160*p* and the value $r_i$. The encryption uses the corresponding cocoon key $\hat{E}_i$. An exemplary encryption scheme is ECIES (see *IEEE Standard Specifications for Public-Key Cryptography—Amendment 1: Additional Techniques*, IEEE Computer Society, 2004, incorporated herein by reference). Other encryption schemes can also be used.

The result, i.e., the encrypted package, is sent to the RA (step 900), together with the RA request ID received by the PCA at step 818. As noted above, signature 730 is omitted. The RA cannot decrypt the package.

The RA "un-shuffles" the data received from the PCA. To perform this operation, the RA matches the RA request ID accompanying each encrypted package with the RA request ID stored in the RA's memory (step 818). The RA forwards to each device 110 the encrypted package for that device (step 910). With each encrypted package, the RA sends to the device the corresponding i value defining the associated cocoon key; see equation (Eq. 11). The RA obtains the i value from the RA request data structure.

At step 914, for each certificate 160*p*, the associated device 110 computes the decryption key $\hat{e}_i$ corresponding to the encryption (cocoon) key $\hat{E}_i$. If $\hat{E}_i$ was set to equal $\hat{X}_i$ (equation (Eq. 13)), then:

$$\hat{e}_i = x + f(i) \quad \text{(Eq. 14)}$$

In the case of equation (Eq. 13'):

$$\hat{e}_i = \text{hash}(\hat{X}_i) + x + f(i) \quad \text{(Eq. 14')}$$

using the same hash function "hash" as was used in equation (Eq. 13').

The device 110 uses the decryption key $\hat{e}_i$ to decrypt the package, and thus recovers the certificate 160*p* and the corresponding $r_i$. This decryption key works because, in the case of equations (Eq. 13), (Eq. 14), the encryption public key is:

$$\hat{E}_i = \hat{X}_i = x \cdot G + f(i) \cdot G$$

In the case of equations (Eq. 13'), (Eq. 14'), the decryption works because the encryption public key is:

$$\hat{E}_i = \text{hash}(\hat{X}_i) \cdot G + \hat{X}_i = \text{hash}(\hat{X}_i) \cdot G + x \cdot G + f(i) \cdot G$$

At step 918, the device verifies the PCA signature 167 using the PCA's public signature key $U_{PCA}$.

At step 922, the device computes its private signature key $u_i$ corresponding to $U_i$. If $U_i$ was computed as in equation (Eq. 12), then the private signature key is created as:

$$u_i = r_i + x + f(i) \quad \text{(Eq. 15)}$$

If equation (Eq. 12') was used, then the private signature key is created as:

$$u_i = r_i \cdot (x + f(i)) \quad \text{(Eq. 15')}$$

At step 924, the device verifies that $$u_i \cdot G = U_i \quad \text{(Eq. 16)}$$

If any of the above checks or verifications fails, the device may reject the certificate 160*p* and/or all the certificates in the batch. The device may also inform pertinent authorities (e.g., misbehaving authority 250) about the error in order to trigger maintenance and/or security operations on malfunctioning or dishonest RA or PCA.

Implicit Certificate Process

Figure 11A:
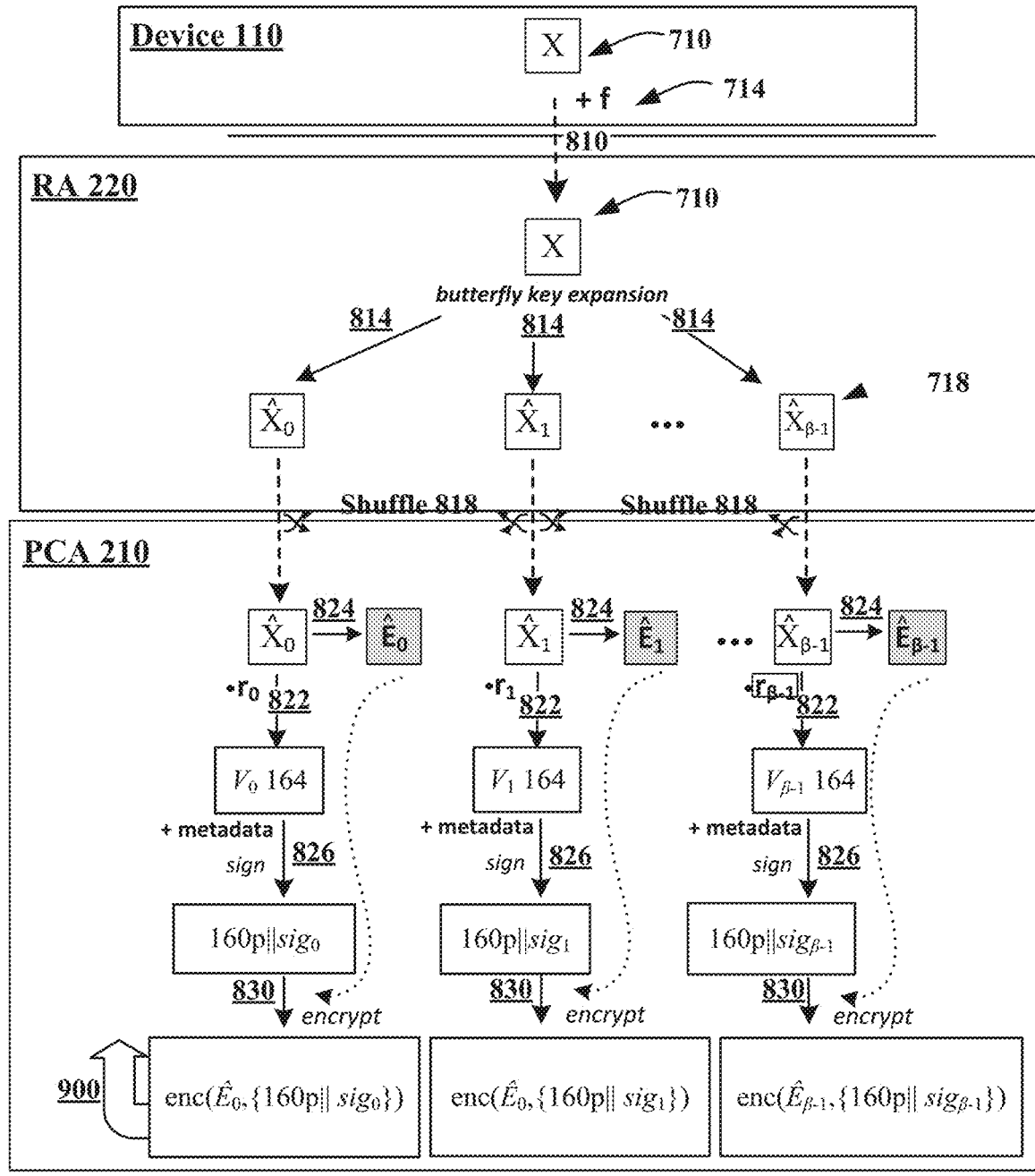
Figure 11B:
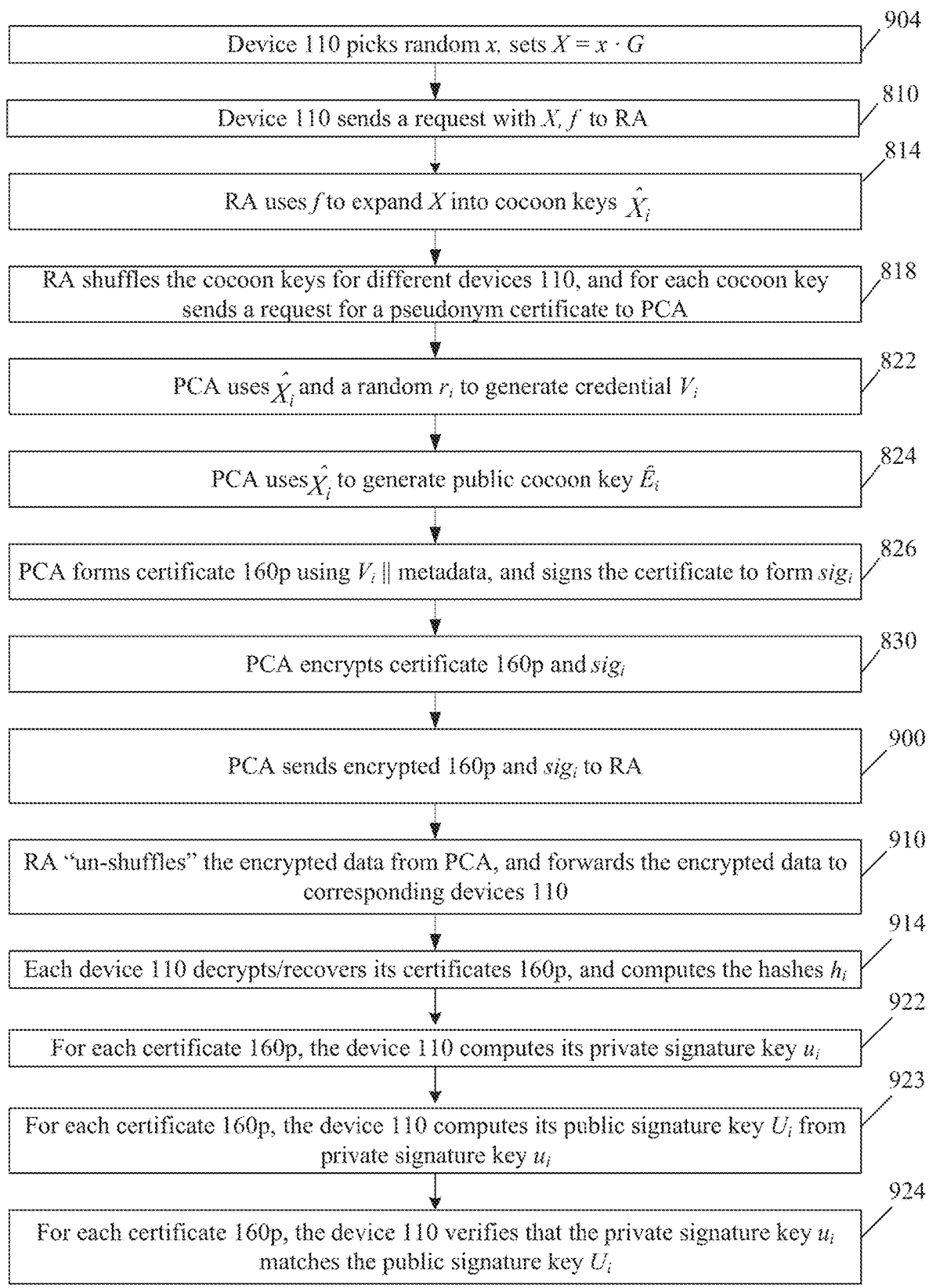

FIGS. 11A, 11B illustrate an implicit certificate scheme, according to some embodiments, which can be used, for example, in eSCMS. Steps 904, 810, 814, 818 are as in FIGS. 10A-B. Then at step 822, the PCA computes a random $r_i$, and computes a credential 164:

$$V_i = \hat{X}_i + r_i \cdot G \quad \text{(Eq. 17)}$$

At step 824, the PCA generates a public cocoon encryption key $\hat{E}_i$, possibly using the same process as for the explicit certificates, e.g., according to equation (Eq. 13) or (Eq. 13').

At step 826, the PCA creates the implicit certificate 160*p*, also denoted cert$_i$, as:

$$\text{cert}_i = (V_i, \text{meta}) \quad \text{(Eq. 18)}$$

i.e.

$$\text{cert}_i = V_i \| \text{meta}$$

where "meta" is the metadata (including validity period 165 etc.).

Also at step 826, the PCA signs this certificate to obtain the signature sig$_i$ as follows:

$$\text{sig}_i = h_i \cdot r_i + u_{PCA} \quad \text{(Eq. 19)}$$

where $h_i = \text{Hash}(\text{cert}_i)$.

At step 830, the PCA encrypts a package which includes (possibly consists of) the certificate 160*p* and the signature sig$_i$. The encryption uses the corresponding cocoon key $\hat{E}_i$. An exemplary encryption scheme is ECIES, but other schemes can also be used.

At steps 900 and 910, the encrypted package is sent to the requesting device 110 via the RA 220, possibly without being signed by the PCA (signature 730 is omitted), using the same process and data structures (including RA request data structures) as in FIGS. 10A-B. The RA cannot decrypt the package.

At step 914, the device 110 receives the encrypted package and the corresponding value i, computes the private key $\hat{e}_i$ as in equation (Eq. 14) or (Eq. 14'), uses this key to decrypt the PCA's response package cert$_i$∥sig$_i$, and then computes:

$$h_i = \text{Hash}(\text{cert}_i) \quad \text{(Eq. 20)}$$

At step 922, the device sets its own private signature key to:

$$u_i = h_i \cdot (x + f(i)) + \text{sig}_i \quad \text{(Eq. 21)}$$

and computes the corresponding public signature key at step 923 as:

$$U_i = u_i \cdot G \quad \text{(Eq. 22)}$$

The device 110 can then verify the validity of the public key $U_i$ by ascertaining, at step 924, that $$U_i = h_i \cdot V_i + U_{PCA} \quad \text{(Eq. 23)}$$

where $U_{PCA}$ is the PCA's public signature key.

Other features of some embodiments are described in Marcos A. Simplicio Jr. et. al., "The Unified Butterfly Effect: Efficient Security Credential Management System for Vehicular Communications," 2018, Cryptology ePrint Archive: Report 2018/089, https://eprint.iacr.org/2018/089.pdf, incorporated herein by reference.

Activation Codes for Pseudonym Certificates (ACPC)

In SCMS and other CRL-based certificate revocation systems, the cost of checking whether a certificate is included in a given CRL grows linearly with the number of devices (e.g., vehicles) included in that CRL. Therefore, ensuring that the number of CRL entries remains small is beneficial not only to save bandwidth when distributing CRLs, but also to allow a faster and more energy-efficient verification of a certificate's revocation status. As already described, SCMS can use a Linkage Authority based mechanism for shortening the CRLs, which associates several certificates to the same entry (lv 234). But this mechanism also extends the lifetime of those entries in the CRL. The reason is that linkage seeds placed into a CRL can only be safely removed from the CRL after all certificates associated to those seeds are expired. Consequently, even if device revocation events occur at a low frequency, CRLs may actually grow big because the corresponding entries will remain in the CRL for a duration comparable to that of certificate batches (e.g., years).

To avoid this growth of CRLs while preserving the performance gains associated with the butterfly key derivation, an activation code scheme is provided, some embodiments of which are usable with SCMS or eSCMS.

More specifically, Activation Codes for Pseudonym Certificates (ACPC) is a solution for efficiently and securely integrating activation codes into SCMS. ACPC builds upon the fact that SCMS encrypts the issued pseudonym certificates, which is done to prevent any system authority from learning which certificates belong to the same user. ACPC adapts the certificate encryption procedure to include a small piece of (initially secret) data, the activation code, without which the corresponding decryption key cannot be computed. Each activation code is unique for each vehicle and allows the decryption of all certificates in a given activation period, which may be larger than each individual pseudonym certificate's validity. By revealing the activation codes for non-revoked vehicles some time before the start of an activation period, the system can gradually and controllably allow the decryption of the appropriate certificates. Hence, even if a large batch of pseudonym certificates is pre-loaded in a vehicle (e.g., during the manufacturing process), it would be unable to use those certificates after being revoked.

Figure 12:
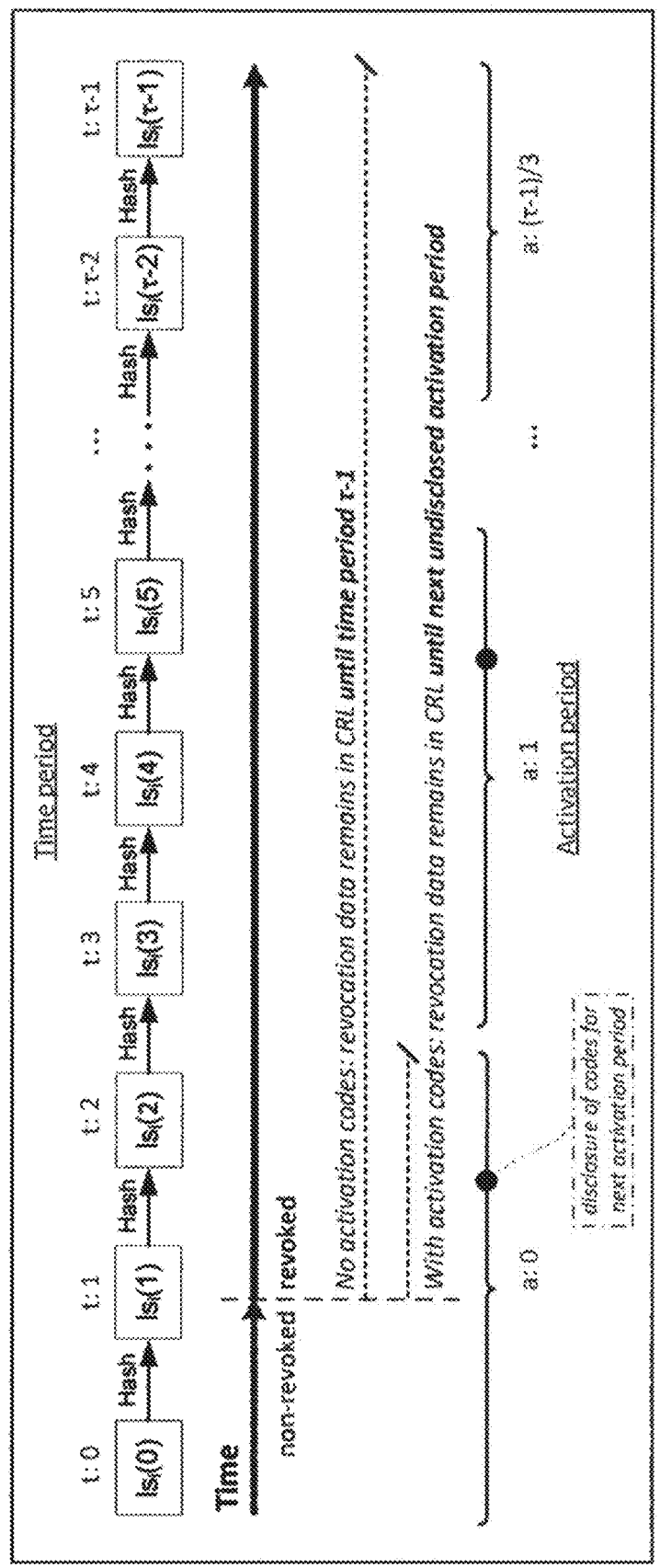
FIG. 12 illustrates a comparison of certificate revocation techniques including some techniques used in some embodiments.

The activation code is a bitstring without which the pseudonym certificates previously acquired cannot be used (for example, cannot be decrypted). Each activation code corresponds to a certain activation period, which spans one or more certificate validity periods 165. This is illustrated in FIG. 12, for each activation period covering 3 validity periods. The t validity periods are marked t:0 through t:$\tau$−1; the activation periods are marked a:0 through a:($\tau$−1)/3. If activation codes are not used, the revocation data remains in the CRL until the end of the last period $\tau$−1, i.e., until all the issued pseudonym certificates expire. If the activation codes are used, the revocation data remains in the CRL only until the end of the activation period, i.e., until all the issued and already activated pseudonym certificates expire.

The activation codes are derived by the vehicles (or other types of devices) from device-specific values (DSVs) periodically disclosed to non-revoked vehicles, before the start of the corresponding validity periods 165, to allow timely activation of the certificates. In some embodiments, each activation code is a DSV. Each DSV corresponds to a specific vehicle and activation period. Revoked vehicles do not receive their DSVs, and are prevented from obtaining activation codes for their certificates, at least until their revocation status is removed. As a result, identifiers (pseudonyms or credentials 164, and/or linkage values 234, as well as any information that allows their computation) of revoked certificates that cannot be activated do not need to remain in CRLs, reducing the CRL size. For example, certificates could be valid for 1 week, whereas the activation period could be set to 4 weeks and the activation codes could be disclosed 1 week before they are actually required. In this case, identifiers for certificates from revoked vehicles would have to remain in CRLs for at most 4 weeks, since after that those vehicles would not receive new DSVs.

Some embodiments of the ACPC scheme address the shortcomings of IFAL and BCAM in terms of performance and security, as discussed herein.

Generating Activation Codes: Binary Hash Trees

In ACPC, a Certificate Access Manager (CAM) is responsible for generating and distributing activation codes. Each CAM is expected to have a unique identifier cam_id. Some embodiments use binary hash trees 840 (FIG. 13) as described below; the use of trees is optional however.

Figure 13:
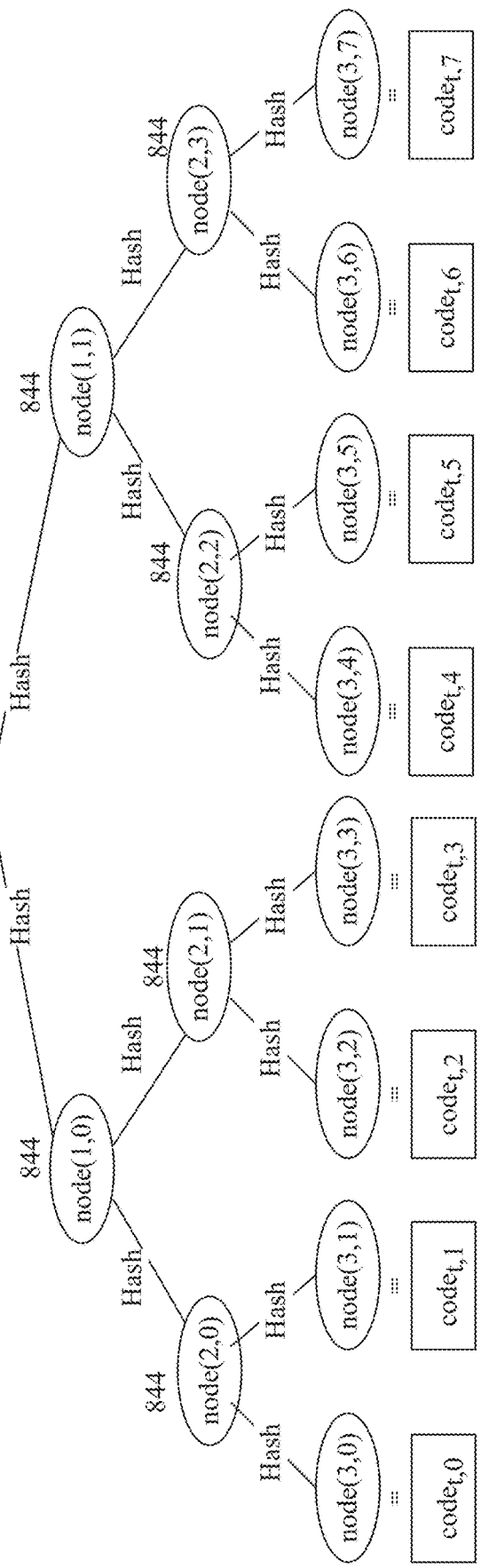
FIG. 13 illustrates a hash tree used in some embodiments.

Similarly to BCAM, some embodiments include one or more Certificate Access Managers (CAM) 838, shown in FIG. 13, each possibly having a different identifier cam_id. CAMs 838 are entities responsible for creating and distributing device-specific values (DSVs). A CAM can be implemented on one or more computer systems 316. To create and distribute the DSVs, CAM 838 creates, in its storage 150S (FIG. 2), a binary hash tree tree$_t$ (tree 840 in FIG. 13) for each time-period t, i.e., each validity period 165. In some embodiments, only one tree 840 is created for each activation period even if the activation period consists of multiple validity periods. If the activation period spans n+1 validity periods, then tree$_t$ = . . . = tree$_{t+n}$.

The tree's nodes 844 are denoted node$_t$ (depth, count), or just node (depth, count) for brevity, where depth $\geq 0$ and $0 \leq \text{count} \leq 2^{depth}-1$ indicates the node's position in the tree. The height of the tree matches the length of the vehicles' identifiers (VID), in bits. As a result, each leaf node$_t$ (depth, count) can be used as a DSV to represent a single vehicle 110 in the system: the vehicle with VID=count. For brevity of notation, we denote by code$_{t,VID}$ the leaf of tree$^t$ whose index corresponds to a given VID, i.e.

$$\text{code}_{t,VID} = \text{node}^t(|VID|, VID) \quad \text{(Eq. 24)}$$

In Kumar et al., for example, the suggested length of VID is 40 bits, which is enough to cover more than 1 trillion vehicles. The bit lengths do not limit the invention.

The hash tree allows compressing the DSVs for distribution to the vehicles: all the leaves of any sub-tree can be distributed by distributing the root of the sub-tree, so if all the leaves of a sub-tree correspond to honest vehicles then only the root of the sub-tree needs to be distributed. Each node of the tree is accompanied by its (depth, count) parameter, so the vehicles can compute the leaf values from the node; in the case of the root, for example, the (depth, count) parameter is (0,0).

In an exemplary embodiment, the nodes 844 are assumed to be k-bit long, yielding a k-bit security level (e.g., in modern deployments k could be 128). The tree 840 is built in the following manner. First, its root $node_t$ (0,0) is set to a random bitstring, unique for each activation period. Every other node 844 is then computed from its parent node combined with a "security string" I, a node-specific suffix. In other words, to compute activation codes, a CAM builds one binary hash tree $tree_t$ of depth D for each activation period t, using a pre-image resistant hash function Hash and suffix-free inputs. More precisely, as depicted in FIG. 13, let $node_t$ (d, c) denote the c-th node at depth d from $tree_t$, which can be uniquely enumerated as $2^d+c$ ($0 \le d \le D$, $0 \le c < 2^d$). Also, let I=(cam_id||t||d||c) be a unique suffix associated with node $node_t$ (d; c), where || denotes concatenation. For a k-bit security level, each node $node_t$ (d; c) is assumed to be k-bit long; for example, some modern systems should adopt $k \ge 128$. Starting from a (pseudo)random root, the nodes of the activation tree are then computed as follows:

$node_t$ (0, 0)={0, 1}$^k$  ▶(pseudo)randomly picked k-long bitstring $$node_t(depth,count)=Hash(node_t(depth-1,[count/2])||I) \quad (Eq. 25)$$

where the security string I is defined as $$I=(cam\_id||t||depth||count) \quad (Eq. 26)$$

If the activation period spans multiple validity time-periods 165, then t can be set to the first time-period 165 covered by that activation period. This approach gives the system enough flexibility to increase or reduce the length of the activation periods without incurring the repetition of security strings. Such non-repeatable security strings are useful to thwart birthday attacks analogous to those described in E. Biham, "How to decrypt or even substitute DES-encrypted messages in 2^28 steps," Inf. Process. Lett., vol. 84, no. 3, pp. 117-124, November 2002, incorporated herein by reference.

The Table below shows suggested lengths for the fields that compose those security strings, leading to |I|=104. This length is large enough to support 40-bit long VIDs for $2^{24}$ time-periods, which means more than 300000 years if the time-periods are 1 week long. At the same time, it is unlikely to have any perceptible impact on the computation of activation trees 840, as long as the hash function's input fits its block size. For example, SHA-256 operates on 512-bit blocks, appending at least 65 bits to its input message (a bit '1' for padding, and a 64-bit length indicator); see NIST, Federal Information Processing Standard (FIPS 180-4)—SecureHash Standard (SHS), National Institute of Standards and Technology, U.S. Department of Commerce, National Institute of Standards and Technology, U.S. Department of Commerce (NIST), Gaithersburg, MD, USA, August 2015, DOI:10.6028/NIST.FIPS.180-4. Therefore, a single call to its underlying compression function is enough to process a 128-bit node value even when it is combined with a 319-bit or smaller security string.

TABLE

COMPONENTS OF THE SECURITY STRINGS EMPLOYED IN THE ACTIVATION TREES ACCORDING TO SOME EMBODIMENTS

| Field | Suggested length (bits) | Description |
| --- | --- | --- |
| depth | 8 | Node's depth in the tree, starting at 0. Mandatory: \|depth\| ≥ lg(\|VID\|). |
| count | 40 | Node's index in the depth, starting at 0. Mandatory: \|count\| ≥ \|VID\|. |
| t | 24 | Time-period to which the tree is associated |
| cam_id | 32 | CAM's identifier |

The equations (Eq. 25) and (Eq. 26), and other tree-related particulars, are optional and do not limit the invention.

Issuing Certificates with Activation Codes

Each vehicle under the CAM's responsibility is associated with a leaf of the activation tree $tree_t$, so that leaf becomes the activation code for time-period t. In other words, if 2D vehicles should be supported by a CAM, so each vehicle receives a D-bit identifier vid, the activation code $code_{t,vid}$ for that vehicle would be simply $node_t$ (D, vid).

Then, where SCMS's key for decrypting a given certificate $cert_i$ would be $e_i$, ACPC makes it $e'_i=e_i+pr\ f(code_{t,vid})$, where pr $f$ is a pseudorandom function. This is done in such a manner than only the CAM knows the actual value of $code_{t,vid}$ and, possibly, only the vehicle's hardware security module (HSM) can compute $e'_i$ from it. Each activation code $code_{t,vid}$ is then be coupled with all certificates from the same vehicle whose validity falls within activation period t. As a result, the disclosure of a single k-bit value is enough to decrypt all those certificates. Likewise, to prevent a vehicle whose identifier is vidr from decrypting its certificates, the CAM would simply not disclose $code_{t,vidr}$.

Figure 14A:
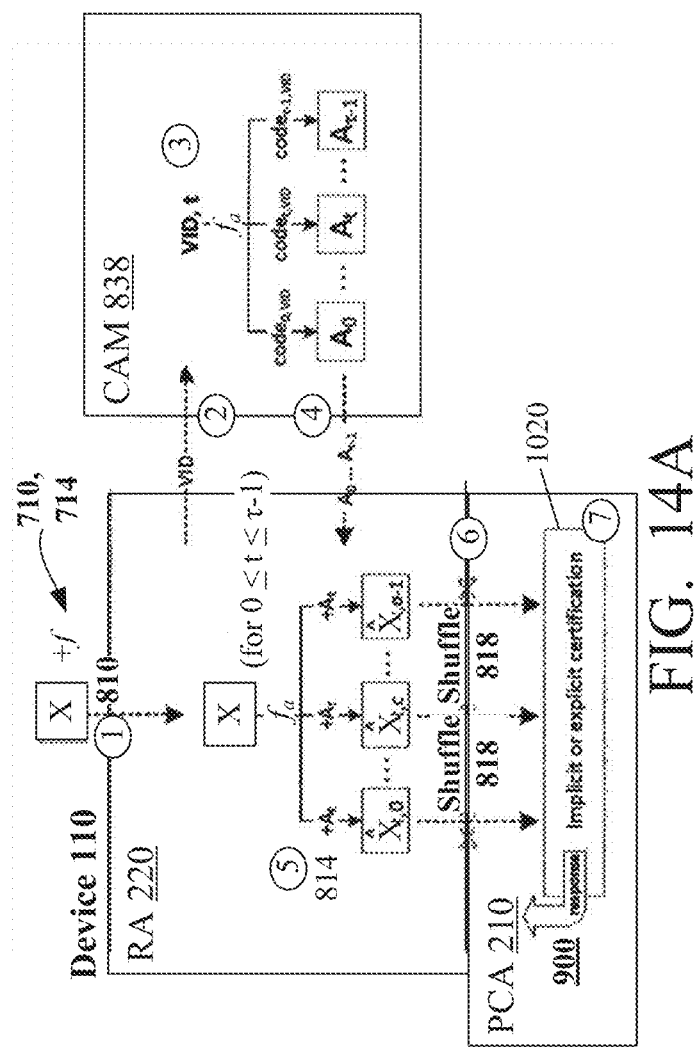
FIGS. 14A, 14B illustrate digital certificate management used in some embodiments.
Figure 14B:
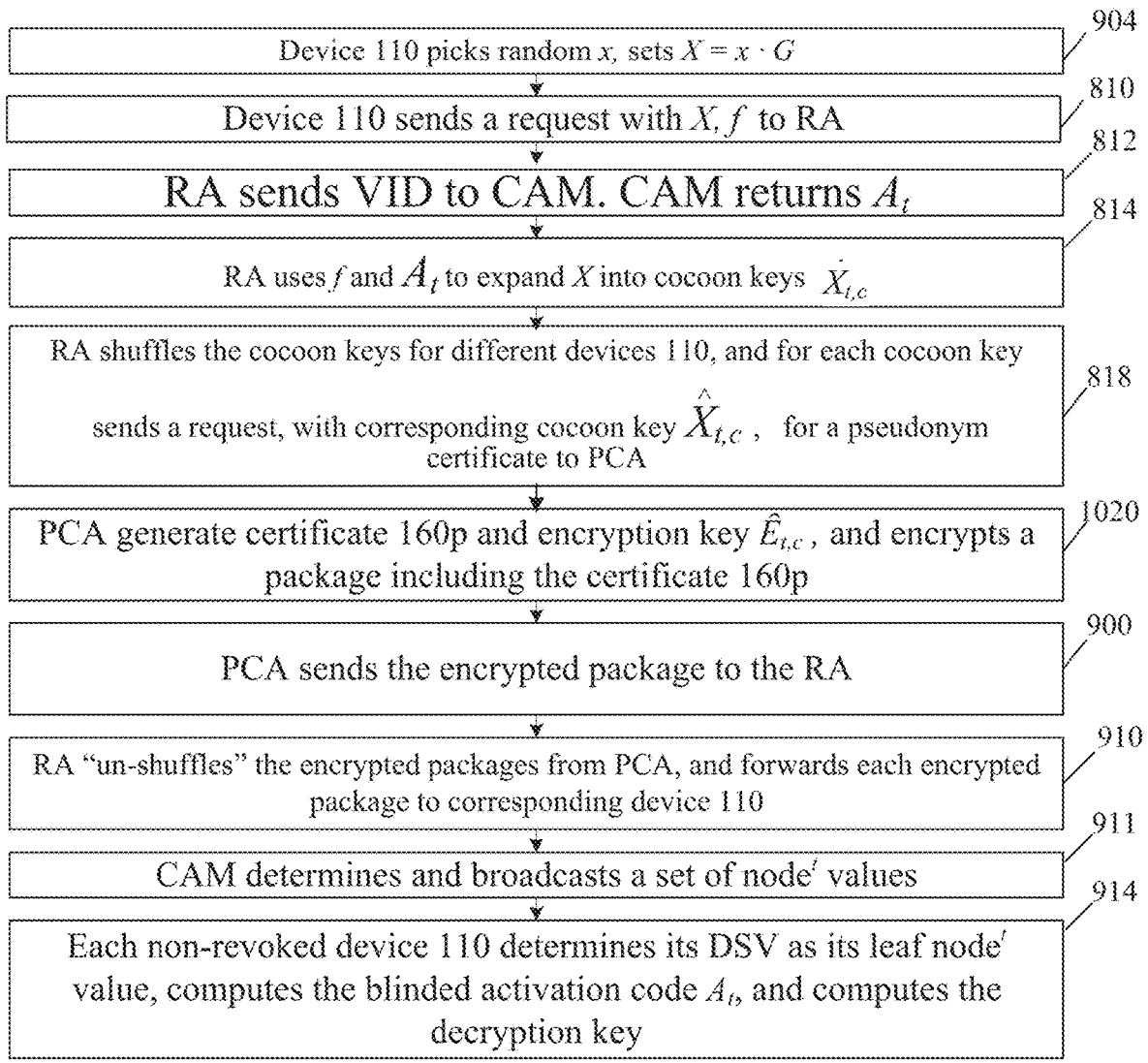

The binary hash trees 840 generated by CAM 838 are employed in the pseudonym certificate issuance process. One example is shown in FIGS. 14A and 14B. In FIG. 14A, the circled numbers 1 through 7 show the sequence of steps.

Steps 904, 810 are as in FIG. 10A-B or 11A-B; circled number 1 corresponds to step 810. Specifically, when a vehicle 110 (or other entity) with a given VID requests a batch of pseudonym certificates from the RA, the vehicle (through its device 110) provides the values (X, $f$) to the RA. Without loss of generality, we assume that the vehicle is requesting a batch of β=τ*σ certificates total, consisting of σ certificates for each of the z time-periods (each time-period corresponds to a validity period 165).

Upon reception of the vehicle's request (step 812, corresponding to circled numbers 2, 3, 4), for each time-period, the RA sends the vehicle's VID and to the CAM, requesting the CAM to provide a blinded activation code $A_t$ for each time-period t from 0 to τ−1, inclusive. The CAM calculates (circled number 3) and returns (circled number 4) the blinded activation codes $A_t$ as follows:

$$A_t=f_a(code_{t,VID},t,VID) \cdot G \quad (Eq. 27)$$

This blinded activation code, when viewed as a public key component, corresponds to the following private key component:

$$a_t=f_a(code_{t,VID},t,VID) \quad (Eq. 27')$$

This operation uses a pseudorandom function $f_a$, which could be instantiated, for example, using a NIST-approved PRF construction and $code_{t,VID}$ as secret seed. As a result, $f_a$'s output is unpredictable because the activation tree's leaf $code_{t,VID}$ has not yet been disclosed by the CAM. The CAM also blinds this value by multiplication by the elliptic curve generator G, so this value cannot be learned by the RA from the CAM's response. In some embodiments, even though it may be assumed for simplicity that a single CAM participates in the generation of certificate batches, in practice multiple CAMs could be contacted by the RA during this process, thus improving the system's resilience against the possibility of a CAM being compromised.

At step 814 (circled number 5), the RA performs the butterfly key expansion, generating cocoon keys. This process is similar to eSCMS, with one important difference: the blinded codes $A_t$ are incorporated into the cocoon keys. More precisely, let $\hat{X}_{t,c}$ denote the c-th public cocoon key for the time-period t. This key is computed by the RA as:

$$\hat{X}_{t,c} = X + A_t + f(t \cdot \sigma + c) \cdot G \qquad \text{(Eq. 28)}$$

for each $0 \leq c < \sigma$ and $0 \leq t < \tau$. This public key corresponds to the following private key:

$$\hat{x}_{t,c} = x + a_t + f(t \cdot \sigma + c) \qquad \text{(Eq. 28')}$$

By using the pseudorandom function $f$ in the computation of cocoon keys $\hat{X}_{t,c}$, the RA ensures that they cannot be later correlated by the CAM or by the PCA, even for groups of keys computed using the same $A_t$. Therefore, this process preserves the unlinkability of pseudonym certificate requests, whether or not CAM and PCA collude.

At step 818 (circled number 6), as in the case of FIG. 10A-B or 11A-B, for each cocoon key $\hat{X}_{t,c}$, the RA generates an RA request, assigns to the request a unique request ID ("RA request ID"), and creates a data structure ("RA request data structure") containing the RA request ID, the cocoon key indices t and c, and the associated device request. The RA requests are shuffled together; the shuffling process is expected to include cocoon keys from different vehicles. The RA request is sent to the PCA with the RA request ID. Also sent with the request are metadata, e.g., the certificate's validity period 165 and the linkage value (lv) 234. The device ID is not provided to the PCA, so the PCA cannot associate the RA request with the device. Also, the PCA cannot determine whether different RA requests are associated with the same or different devices.

The PCA processing of each request can be as in FIG. 10A-B or 11A-B (steps 822-830), and is generally shown at step 1020 (circled number 7) in FIGS. 14A-B. The index i in FIGS. 10A-B and 11A-B corresponds to the pair (t,c) in FIGS. 14A-B.

More particularly, at step 1020, the PCA computes the public cocoon encryption key $\hat{E}_{t,c}$ as in equation (Eq. 13) or (Eq. 13'). Equation (Eq. 13) provides:

$$\hat{E}_{t,c} = \hat{X}_{t,c} \qquad \text{(Eq. 13AC)}$$

Equation (19') provides:

$$\hat{E}_{t,c} = \text{Hash}(\hat{X}_{t,c}) \cdot G + \hat{X}_{t,c} \qquad \text{(Eq. 13AC')}$$

The PCA also computes the vehicle's (implicit or explicit) pseudonym certificate, as at steps 822, 826 in FIGS. 10A-B, 11A-B.

The resulting certificates are concatenated with appropriate values ($r_i$ or $sig_i$ in FIG. 10A-B or 11A-B, where the index i corresponds to the (t,c) pair) to form a package which is then encrypted with $\hat{E}_{t,c}$ (step 830) before being sent back to the RA at step 900. The RA, in turn, un-shuffles the packages and relays them to the corresponding vehicle, without contacting the CAM again (step 910), as in FIG. 10A-B or 11A-B.

Since the PCA processing (steps 1020, 900) and subsequent RA processing (step 910) are identical to eSCMS, the processing costs and bandwidth usage at the PCA remain unchanged. In addition, the underlying security properties of eSCMS still apply, including the protection against MitM attacks performed by the RA.

As a result of this process, the certificate encrypted by $\hat{E}_{t,c}$ can only be decrypted if the vehicle also obtains the corresponding DSV=$code_{t,c}$. After all, in the case of equation (Eq. 13AC'), the decryption key is now computed as:

$$\hat{e}_{t,c} = \text{Hash}(\hat{X}_{t,c}) + \hat{x}_{t,c} \qquad \text{(Eq. 29')}$$

where $\hat{x}_{t,c}$ is defined given by equation (Eq. 28').

so

In the case of equation (Eq. 13), the decryption key is:

$$\hat{e}_{t,c} = \hat{x}_{t,c} \qquad \text{(Eq. 29)}$$

Moreover, for unified butterfly keys, the key $\hat{X}_{t,c}$ received by the PCA depends on $code_{t,VID}$, and so does the private signature key $u_{t,c}$ whether it is computed in the explicit or implicit model. More precisely, for explicit certificates we have, if the processing is as in equation (Eq. 12):

$$u_{t,c} = x + \eta_a(code_{t,VID}, t, \text{VID}) + f(t^* \sigma + c) + r_{t,c}$$

where $r_{t,c}$ is generated by the PCA at step such as 822 (FIGS. 10A-B) and sent (encrypted) to the vehicle at step 900.

If the processing is as in equation (Eq. 12'), then:

$$u_{t,c} = r_{t,c}(x + \eta_a(code_{t,VID}, t, \text{VID}) + f(t^* \sigma + c))$$

For implicit certificates, the private key is $$u_{t,c} = h_{t,c}(x + \eta_a(code_{t,VID}, t, \text{VID}) + f(t^* \sigma + c)) + sig_{t,c}$$

Therefore, to keep a vehicle with an identifier $\text{VID}_r$ from activating its certificates, it suffices to prevent the vehicle from obtaining its DSV=$code_{t,VID_r}$. In that case, the CRL entries for that vehicle's certificates do not need to remain in CRLs any longer than one or a few activation periods.

Distributing or Broadcasting Activation Codes

If the hardware security module (HSM) of revoked vehicles can be trusted, the CAM can broadcast a "soft revocation list" containing the IDs of revoked vehicles. Complying HSMs might then refuse to derive the decryption key for its certificates, even though the corresponding activation codes are released by the CAM. Nevertheless, assuming HSMs may be tampered with, the CAM would need to resort to a hard revocation approach. In this case, to ensure the distribution of activation codes for all non-revoked vehicles, while preventing all revoked nodes from obtaining theirs, the CAM leverages one essential property of binary hash trees: except for the root, any node can be computed if and only if its parent is known. Hence, if there is no revoked vehicle in a given activation period t, the CAM can disclose the activation tree's root $node_t(0,0)$. As a result, all vehicles would be able to decrypt their own certificates. Conversely, to revoke a vehicle whose identifier is $vid_r$, the disclosed activation tree should not include any ancestor of $code_{t,vidr}$. This is illustrated in FIG. 13, where the revocation of $vid_r=5$ (associated with leaf $node_t(3,5)$, marked with dashed lines) leads to the disclosure of shaded nodes $node_t(1,0)$, $node_t(2,3)$, and $node_t(3,4)$. The omission of all nodes going from revoked leaves and the root should be enforced for any activation period t after the revocation occurs, or until that vehicle is reinstated.

Since the released nodes consist of strictly public information, any channel that would be used for distributing CRLs can be employed for their distribution. For example, the CAM can use an actual broadcast channel (e.g., satellite-based), if available; in this case, vehicles would not need bidirectional communication with the system. Another possibility is to simply upload those activation codes to cache units (e.g., websites), from which they can be downloaded by any device. For example, users may download activation codes overnight using their mobile phones, and then transfer those codes via a local connection (e.g., Bluetooth) to their own vehicles. Also, vehicles and roadside units could also serve as caching units, so they can share the activation tree (e.g., via peer-to-peer protocols), following a vehicle-as-a-resource approach.

As shown in FIG. 14B at step 911, sometime before each validity period t (period 165), CAM 838 determines the leaf node indices (depth,count) of the valid vehicles (or other devices), and determines a minimal set of node indices (depth, count) from which the leaf node values (DSVs) can be computed for the valid vehicles via equations (Eq. 25) and (Eq. 26) but not by any revoked vehicle. The minimal set can be determined as in BCAM for example: each node index in the minimal set is a root of a subtree whose leaves correspond to only "honest" (valid) vehicles.

The CAM then distributes the $node_t$ (depth,count) values of the minimal set from the tree 840 corresponding to the relevant period t. These values can be distributed to only the non-revoked vehicles, or can be broadcast to all vehicles; there is no need for bidirectional connectivity between vehicles and CAMs. Each $node_t$ value is accompanied by its t and (depth, count) parameters. These values can be provided to an intermediate system (not shown) for caching; each vehicle can obtain these values from the intermediate system at a time convenient for the vehicle.

As is clear from the above, the tree's nodes of the minimal set depend on which nodes are currently revoked/suspended, taking into account that every node of binary hash trees can be computed from its parent. For example, given the root of the tree, all of its leaves can be computed and, thus, all vehicles can obtain their corresponding activation codes. Hence, if no vehicle is revoked in time-period t, the CAM only needs to broadcast $node_t$ (0,0) to allow all certificates in the system to be activated. This leads to optimal performance when distributing activation codes.

When a vehicle needs to be revoked, however, the CAM does not reveal any of the nodes in the path between the corresponding leaf and the tree's root. This prevents the computation of that leaf by any device, including a non-revoked vehicle that might try to collude with a revoked device to allow the activation of the latter's certificates. For example, consider the tree shown in FIG. 13. To revoke the vehicle whose VID is 4, the CAM would have to broadcast only the following nodes: node (1,0), which enables the computation of leaves nodes (3,0) through (3,3); node (2,3), used to compute leaves node (3,6) and node (3,7); and the leaf node (3,5). More generally, and as mentioned in Kumar et al., when $n_r$ users out of $n_t$ are revoked the number of nodes included in the message broadcast by the CAM is on average $n_r \cdot \lg(n_t/n_r)$ for $1 \leq n_r \leq n_t/2$ (cf. Theorem 1 of W. Aiello, S. Lodha, and R. Ostrovsky, "Fast digital identity revocation (extended abstract)," in Proc. of the 18th Annual International Cryptology Conference on Advances in Cryptology (CRYPTO'98). London, UK, UK: Springer-Verlag, 1998, pp. 137-152), incorporated herein by reference. Hence, albeit more expensive than the scenario in which no revocation occurs, this approach is still more efficient than the individual delivery of each activation code. Actually, there are also efficient methods for encoding binary hash trees such as those hereby described, so the index of each node included in the broadcast message can be represented with less than |VID| bits, saving some bandwidth.

At step 914, each non-revoked device 110 computes its leaf value $code_{t,VID}$ (the DSV) from the values distributed by the CAM at step 911. This computation can be done according to equations (Eq. 25) and (Eq. 26).

Also at step 914, each non-revoked device 110 determines, for each encrypted certificate 160p, the decryption key per equations (Eq. 29) or (Eq. 29'). The device uses the decryption key to decrypt the certificate.

The remaining steps can be as in eSCMS, including the verification of the PCA signature formed at step 826, and determining the device's signature key $u_{t,c}$.

Security of the Certificate Issuance Process

In ACPC (embodiments of which are shown in FIGS. 14A-B), collusion between CAM and PCA (respectively RA) reveals as much information as the PCA (respectively RA) had available in eSCMS. Indeed, if we remove the influence of $A_t$ over the public cocoon keys computed as described in FIGS. 14A-B, the result matches the public cocoon keys in eSCMS. Therefore, a collusion with the CAM can only remove the entropy introduced by this entity, while still preserving eSCMS's security properties.

In particular, a vehicle's caterpillar private key x remains protected by the elliptic curve discrete logarithm problem (ECDLP) during the whole execution of the protocol. Hence, the RA, PCA and CAM are unable to recover the signature or decryption private keys derived from it, even if they collude. Unlinkability among certificates is similarly preserved, as long as the RA and PCA do not collude: the shuffling done by the RA still hides from the PCA any relationship between certificate requests intended for the same vehicle; meanwhile, the PCA's encrypted response prevents anyone but the appropriate vehicle from learning certl. Finally, since the (unified) butterfly key expansion process grants vehicles the ability to verify whether or not the received certificates were generated in a fair manner, MitM attacks (e.g., by the RA) are averted.

The aforementioned CAM's inability to create a new threat via collusion is not just a fortunate coincidence. Actually, the (unblinded) activation codes $code_{t,VID}$ are the only information that is initially kept secret by the CAM and, thus, that could be contributed in such collusion. Since those codes are periodically disclosed to allow vehicles to activate their certificates, though, such public disclosure should not negatively impact the system's security. Consequently, a "private disclosure" during a collusion is expected to have an analogous result.

Security of the Revocation Procedure

The security features discussed below do not limit the invention. The invention may cover embodiments that do not possess such features.

In some embodiments, the security of ACPC's revocation procedure relies on the first pre-image resistance of the hash function employed for the construction of activation trees 840, as well as the proper disclosure of its nodes by the CAM. In principle, this means that the choice of a secure hash function is enough to enforce revocation. At least this should be the case if it is assumed that the system's entities would gain nothing by illegitimately un-revoking vehicles, i.e., without authorization from the MA. Nonetheless, it is useful to evaluate what happens when one of the system's entities is compromised and, as a result, its capabilities are misused aiming to allow the activation of revoked devices.

On the one hand, a rogue/compromised CAM could disclose the roots of every activation tree to all vehicles, even revoked ones, allowing all certificates in the system to be activated. This would not give the attacker any advantage over the system, though, besides disrupting its ability to revoke devices efficiently. In particular, in consonance with the discussion in the preceding section, this would not grant the CAM or any other entity the ability to track devices. Consequently, it is unlikely that the CAM itself would go rogue and engage in such malicious activity. Furthermore, if the CAM's storage is somehow compromised, the leakage of codes can still be contained by keeping the revoked vehicles' data in CRLs, just like in the original SCMS or eSCMS. Hence, the attack would not result in any catastrophic security breach, but only nullify the performance gains provided by activation codes.

On the other hand, a security breach at the RA or PCA should not reveal any information about activation codes. The reason is that these entities never learn such codes, which are only known by the CAM. Nevertheless, if any of these entities goes rogue or is compromised at a level that allows its behavior to be controlled by attackers, it can provide valid certificates to revoked vehicles independently of activation codes. Specifically, a dishonest PCA can always issue new pseudonym certificates for vehicles, including revoked ones, at least until the PCA itself is revoked. A compromised RA could act similarly, e.g., by requesting pseudonym certificates for a non-revoked $VID_d$, and then delivering those certificates to a revoked vehicle whose identifier is $VID_r \neq VID_d$. Such misbehavior is likely to go unnoticed because the certificates do not carry any VID on them. In addition, if $VID_d$ corresponds to a valid vehicle whose pseudonym certificates have not been requested yet, the CAM would not be able to notice the fraud by the RA. Actually, even if $VID_d$ has already been requested in the past, trying to prevent such attack by configuring the CAM to refuse a second request for the same $VID_d$ is likely to create management issues. For example, the processing of the initial request for $VID_d$ may naturally fail, so an honest RA would actually need to send a second request referring to the same $VID_d$. As another example, a dishonest RA might abuse this process by performing a "denial-of-certification" attack: the RA queries the CAM requesting the caterpillar keys for a non-revoked $VID_d$, but it does not execute the pseudonym certificate issuance process; future requests referring to $VID_d$, potentially by honest RAs, would then fail.

These observations indicate that, even if a rogue RA or PCA never gains access to activation codes, their roles in the system still enable them to provide valid certificates for revoked vehicles. Actually, a similar discussion also applies to the original BCAM protocol, in which a rogue RA or PCA could provision revoked vehicles with the PCA-encrypted certificates, before they are once again encrypted by the CAM. Nevertheless, ACPC's approach of ensuring that only the CAM is able to distribute activation codes was adopted because, even though this does not actually prevent such threats, it does reduce the system's attack surface. For example, suppose that RA and/or PCA store the (PCA-encrypted) certificates generated for the purposes of disaster recovery. In this case, a data breach disclosing the certificates issued for a vehicle that is now revoked does not create any security concern, since that vehicle remains unable to decrypt those certificates. To compensate this inability of using those certificates for disaster recovery for non-revoked devices, RA and PCA could then issue new pseudonym certificates, possibly revoking the old ones.

In some embodiments, the activation codes are available to the RA or PCA or both. For example, the blinded activation codes $A_t$ and corresponding $a_t$ may be computed by the RA from the activation codes.

In some embodiments, the trees 840 are not used; the CAM distributes the leaf node values or the $a_t$ values for example.

In some embodiments, vehicles may be equipped with a hardware security module (HSM), which might be deactivated via a "soft-revocation" mechanism. Instead of asking the CAM to omit nodes from the binary tree, the Misbehavior Authority could periodically issue a soft-revocation list (SRL) containing identifiers of revoked vehicles; as a result, the HSMs of vehicles listed in the SRL are expected to simply refuse to compute the decryption keys for the corresponding certificates. To enable this feature, the HSM may export a CAM-encrypted symmetric key k, which is included in the vehicle's request for pseudonym certificates. Then, the CAM can ensure that the HSM is the only entity capable of decrypting certificates by computing the blinded activation values as $\eta_a(k, code_{t,VID}, t, VID) \cdot G$. The advantage of this approach is that it potentially leads to smaller messages broadcast by CAMs. After all, the (hard) revocation of vehicles forces the CAM to disclose multiple nodes of the revocation tree, rather than only its root. If, however, those vehicles are known to be soft-revoked due to a compliant HSM, the activation tree's root can be disclosed without negative impacts to the system's security.

Comparison with Other Approaches: IFAL and BCAM

When compared to IFAL, ACPC (FIGS. 14A-B) differs in at least two aspects. First, IFAL allows an "honest but curious" PCA to link several certificates to the same device; this privacy issue is absent in the solution hereby described if it is assumed, like in the original SCMS, that PCA and RA do not collude. Second, ACPC allows vehicles to obtain activation much more efficiently than IFAL's strategy, using binary hash trees to broadcast activation codes rather than requiring vehicles to individually request them.

Architecturally, ACPC shares similarities with BCAM, in particular, because both BCAM and ACPC use binary hash trees for the distribution of activation codes. Nevertheless, by integrating security strings into the activation trees, the nodes of those trees can be 128-bit long while still preserving a 128-bit security level, despite the number of revoked devices. When compared to BCAM, which uses 256-bit nodes, ACPC represents a 50% bandwidth gain for the distribution of activation trees.

In terms of processing, in some embodiments, the ACPC design leads to costs slightly higher than those obtained with BCAM. This happens because the symmetric encryption at the CAM and subsequent decryption at vehicles are replaced by the computation of one elliptic curve point, $A_t$, for each activation period. However, this saves bandwidth between the RA and the CAM, because these entities only exchange data that represent nodes from activation trees, rather than batches of certificates. Even more importantly, the fact that the CAM does not receive certificates from the RA prevents the former from learning which PCA encrypted certificates belong to the same device. In addition, it also reduces the attack surface by a rogue RA or PCA. Hence, the ACPC is able to protect the vehicle's privacy even if PCA and CAM collude or are compromised.

The ACPC solution provides an approach for issuing pseudonym certificates and distributing activation codes for previously issued pseudonym certificates, efficiently preventing revoked devices from using those certificates. When compared to other techniques, it brings advantages in terms of security and efficiency. Namely, it reduces the sizes of CRLs, such as those employed in solutions such as SCMS and eSCMS. It also reduces computational costs, especially in terms of bandwidth usage, when compared with solutions such as BCAM. Finally, it avoids the creation of points of collusion, so it is not possible for the PCA alone to violate the users' privacy (unlike IFAL), nor for the PCA and CAM to collude for this purpose (unlike BCAM). The solution is also suitable for non-pseudonym certificates.

Integrating Activation Codes into Other Certificate Issuing Process

Similar activation techniques can be used with SCMS (FIGS. 7, 8). For example, the RA may compute $A_t$ and $\hat{X}_{t,c}$ as described above for eSCMS, and determine the encryption key $\hat{E}_{t,c} = \hat{E}_t$ per equation (Eq. 13AC) or (Eq. 13AC'). The steps 822 through 900 can be as in FIG. 7 or 8. The activation can be as in FIG. 14B at steps 911-914.

Unicast Distribution of Activation Codes: Balancing Privacy and Efficiency

According to embodiments of the present disclosure, systems and methods are provided to balance between: (1) the fully anonymous reception of activation codes, via broadcast, which can lead to potentially large bandwidth usage; and (2) the direct request of the desired activation code, which would be optimal in terms of bandwidth efficiency but allows the entity receiving the request (e.g., a caching unit) to identify the vehicle performing the request.

When activation codes are distributed via a broadcast model, ACPC's bandwidth usage is likely higher than what is usually obtained with SCMS-based CRLs (which are also distributable via broadcast). More precisely, when $n_r$ vehicles out of $n_t$ are hard-revoked, the number of nodes included in the broadcast is at most $n_r \cdot \lg(n_t/n_r)$ for $1 \leq n_r \leq n_t/2$. Hence, if the CAM should support $n_t = 240$ vehicles for a security level of $k=128$, the amount of data broadcast/cached for 10 and 10,000 revocations may reach the order of kilobytes and megabytes, respectively. In comparison, CRLs as specified in the original SCMS take roughly 32 bytes per revoked vehicle (taking into account two 16-byte "linkage seeds," while ignoring ancillary data).

Even though such growth of activation trees is inherent to binary hash trees whenever hard-revocations are necessary, in ACPC vehicles do not need the whole tree for decrypting their certificates. Actually, each vehicle needs a single node of the tree, namely the one that sits on the path between its corresponding leaf and the root. When $n_r = 0$, the root would suffice, and maximum efficiency is attained. When $n_r \geq 1$ though, vehicles could request only a part of the activation tree containing the required node, rather than its entirety. Interestingly, neither the request nor the response need to be authenticated: the data enclosed in the response would be public anyway, and invalid node values can be detected by the vehicle simply by checking that the decrypted data does not match a valid certificate. This contrasts with CRLs, which (1) must be signed to avoid counterfeits, and (2) must be obtained in their entirety because, otherwise, the enclosing signature cannot be verified and some revoked certificates may be not be identified as such.

Following such a strategy of requesting only part of the activation tree, the actual bandwidth costs for vehicles can be much smaller than what would be obtained with CRLs or frequent provisioning. A potential drawback, in this case, is that the requester may end up revealing its own identity to the responder, or even to eavesdroppers if the communication is done via an insecure channel. After all, while any vehicle might be interested in downloading the entire tree, a subset that does not include $node_t$ (d, c) would not be requested by a vehicle whose leaf is a descendant of the omitted node. Taking into account the need of balancing privacy and bandwidth efficiency in ACPC, described herein are different methods, systems, or techniques for requesting a subset of the activation tree whenever $n_r \geq 1$. These are Direct Request (DR), Fixed-Size Subset (FSS), and Variable-Size Subset (VSS)

Figure 15:
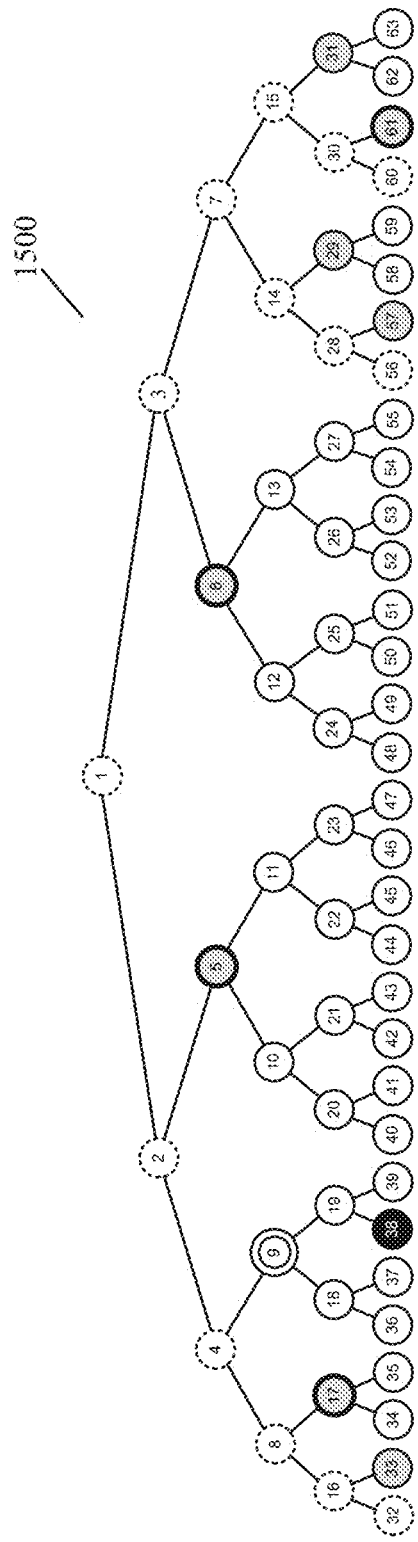
FIGS. 15 and 16 illustrate examples of activation trees, according to some embodiments.
Figure 16:
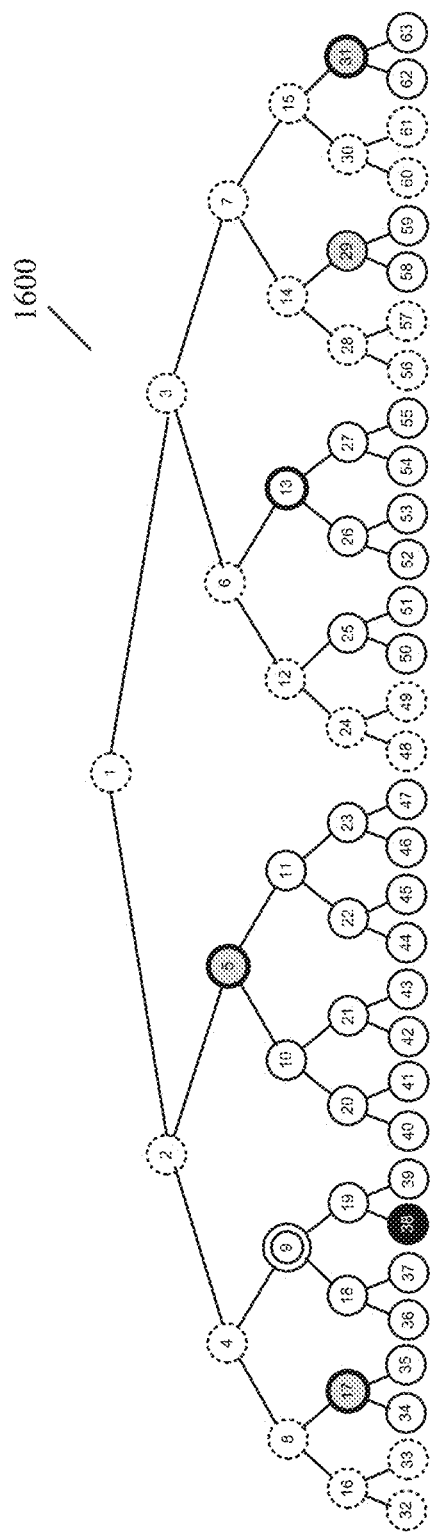

To illustrate each approach, reference is made to the example activation trees shown in FIGS. 15 and 16. Both trees have depth D=5 (i.e., they support 25=32 vehicles), and depict the selection made by the vehicle associated with leaf 38 for different revocation scenarios.

FIG. 15 shows an example of activation tree 1500 with depth D=5. There are three revoked vehicle nodes ($n_r=3$); these are nodes 32, 56, and 60 (indicated by a dotted border). Nine nodes are available for picking; these are nodes 5, 6, 9, 17, 29, 31, 33, 57, and 61 (indicated by shading). FIG. 16 shows an example of activation tree 1600 with depth D=5. Here, eight vehicle nodes are revoked ($n_r=8$); these nodes are 32, 33, 48, 49, 56, 57, 60, and 61 (indicated by a dotted border), all associated with sibling leaves. So six nodes are available for picking; these are nodes 5, 9, 13, 17, 29, and 31 (indicated by shading).

In other words, in FIG. 15, leaves or nodes 32, 56 and 60 are revoked, while FIG. 16 extends this scenario by additionally revoking leaves or nodes 33, 48, 49, 57 and 61. Privacy is then measured, with the privacy level computed as the number of vehicles that could have made the same selection and, thus, with which the requester can be confused. This metric may be referred to as crowd size, although it could also be called anonymity set.

Direct Request (DR)

The DR approach may provide maximum bandwidth savings. Here, the vehicle can download or directly request a single 16-bytes value, which may be the node on the path to its leaf, denoted n*, or the leaf itself. For example, in the scenarios illustrated in FIGS. 15 and 16, the vehicle associated with leaf 38 could request either n*=9 or node 38 directly. The former case requires knowledge of the list containing all revoked IDs, so n* can be determined by the vehicle. Referring to FIG. 15, under the DR approach, to obtain its activation code, the vehicle associated with leaf 38 needs to request node n*=9 (indicated by a double circle). Likewise, referring to FIG. 16, under the DR approach, to obtain its activation code, the vehicle associated with leaf 38 needs to request node n*=9 (indicated by a double circle).

Since each ID can be represented by a D-bit string, an additional bandwidth usage of $D \cdot n_r$ applies if the whole list is downloaded, although in some embodiments some vehicles may prefer to store this list and refresh it via delta updates. Conversely, the latter case does not involve any additional bandwidth, since the responder may either: (1) provide n* despite being asked for a leaf; or (2) compute the leaf on the vehicle's behalf, by performing up to D hash computations.

While efficient, the privacy level provided by the DR approach can be minimal. In particular, any vehicle requesting its own leaf-either willingly or due to a revoked sibling-achieves a crowd size of 1, thereby revealing its own identity. One example of the latter case refers to the vehicle associated with leaf 33 in FIG. 15: since the sibling leaf 32 is revoked, there is no higher node to be requested. Other vehicles can achieve a higher privacy level, however, since the crowd size when requesting a node at depth d is given by $2^{D-d}$. For example, if the vehicle associated with leaf 38 requests node 9 (at depth 2), the resulting crowd size is 4, since that request could be made by any vehicle interested in computing a leaf between 36 and 39.

Fixed-Size Subset (FSS)

The FSS approach can increase the system's privacy. Under the FSS approach, each vehicle can pick as many nodes as the activation tree's depth D, according to the following rules:

Rule I: Similar to the DR approach, in the FSS approach, a vehicle picks the highest node on the path to its leaf n*. Let d* denote the depth of that node.

Rule II: For all other pickings, the FSS approach tries to include one random node from each other depth d≠d*. That will not be always possible, since some depths may not have any nodes available. In this case, the FSS approach may randomly select extra nodes from the lowest depths (since they provide better privacy), until D nodes are picked in this manner or there are no nodes left to be picked.

In some examples, this is accomplished with Algorithm 1, shown in FIG. 17. Algorithm 1 is an example of a pseudo-code for node selection, that may apply to FSS and VSS. For FSS, assume that there is no privacy (set the level of privacy=0).

The total data to be downloaded in this case for the FSS approach remains relatively small, comprising only 16·D bytes, besides the list of revoked nodes' IDs that allow the activation tree to be built so nodes can be selected accordingly. In addition, FSS reduces the variability of the crowd size obtained by vehicles when compared with the DR approach. Indeed, in any request, all vehicles obtain a crowd size larger than $2^{D-min(d)}$, which is the privacy level provided by the shallowest node available for picking. If all vehicles follow this simple strategy, they would collaboratively help to conceal vehicles that are siblings of revoked nodes. In this case, requests containing a leaf because it is the required n* (Rule I) cannot be distinguished from those where the leaf was randomly picked at depth D (Rule II). This indistinguishability should prevail as long as different requests from the same vehicle remain anonymous and unlinkable to each other; otherwise, if an observer can tell that requests from the same vehicle always contain a given node n, it can infer that n=n*. Fortunately, accomplishing such unlinkability is quite simple in this scenario: it is a matter of sending the request via an unauthenticated channel (e.g., HTTP), or via a secure channel that supports server-side authentication (e.g., HTTPS). If only authorized vehicles should be served, though, then the entity responsible for authorization could provide vehicles with anonymous, one-time tickets for each activation period. For example, for a 3-months activation period, vehicles provisioned with 120 authorization tickets could activate all their pseudonym certificates for 30 years.

To illustrate the FSS approach, consider the tree 1500 of FIG. 15. Following Rule I, the vehicle associated with leaf 38 starts by including node n*=9 (from depth d*=3) in its request. Then, following Rule II, it randomly picks nodes 5, 17 and 61 from depths 2, 4 and 5, respectively. Since the tree 1500 has no available nodes at depth 1, it also selects one extra node from depth 2, node 6, thus selecting a total of D=5 nodes. Thus, following the FSS approach, the vehicle also includes D−1 extra nodes (i.e., 5−1=4) in its request; these nodes are 5, 6, 17, and 61 (indicated by the thick border). They are randomly picked from each depth, and from lower depths (namely, depth 2) if some have zero nodes available (namely, depth 1). The crowd size for the resulting set {5, 6, 9, 17, 61} is then $2^3+2^3+2^2+2^1+2^0=23$, which corresponds to 79% of the 29 non-revoked vehicles in the system.

As another example, in the scenario shown in FIG. 16 there are no nodes available at depths 1, and 5. Hence, the vehicle associated with leaf 38 requests node n*=9 (required) from depth d*=3, node 5 from depth 2, and node 17 from depth 4. Since it still needs two additional nodes, it also includes in its request: (1) node 13 from depth 3, since it is the shallowest node available; and (2) node 31, randomly picked from the remaining shallowest nodes, from depth 4. Thus, following the FSS approach, the vehicle also includes D−1 extra nodes (i.e., 5−1=4) in its request; these are nodes 5, 13, 17, and 31 (indicated by thick borders). They are randomly picked from each depth, and from lower depths (namely, 3 and 4) if some have zero nodes available (namely, depths 1 and 5). In this case, the crowd size from set {5, 9, 13, 17, 31} becomes $2^3+2^2+2^2+2^1+2^1=2^0$, or 83% of the 24 non-revoked vehicles.

Despite involving a larger number of revocations, the privacy level obtained in FIG. 16 is higher than the one obtained in FIG. 15. This happens because a node with a lower depth in the tree is picked in FIG. 16 where a leaf would be picked in FIG. 15, since all sibling leaves are revoked in the former. Nevertheless, on average vehicles should expect lower privacy as the number of revocations grows. The reason is that each revocation raises the chance that nodes from lower depths become unavailable because one of its descendant leaves is among the revocation targets. In the worst case, each new revocation removes one extra node from the activation tree's lowest depth (i.e., those that provide a larger crowd size). As a result, all nodes from depths lower than $d=\lceil \lg(n_r) \rceil$ become unavailable, forcing the vehicle to pick d+1 nodes from depth d+1. The crowd size obtained is, thus, at least $(\lceil \lg(n_r) \rceil+1) \cdot 2^{D-1}/n_r$, which corresponds to the crowd size provided by such lower depth nodes (i.e., ignoring the privacy added by pickings from higher depths).

Variable-Size Subset (VSS)

In some embodiments, the VSS approach can be an extension of the FSS approach. In the VSS approach, vehicles could increase their own privacy by randomly selecting extra nodes from the activation tree's shallowest depths, and including those nodes in their requests. In some examples, this case is covered by Algorithm 1 by setting the level of privacy >0, indicating that extra privacy is desired.

For example, suppose that the vehicle associated with leaf 38 wants to increase the crowd size in the scenario from FIG. 15. Namely, assume its goal is to be confused with at least 83% of non-revoked nodes, as was the case with the FSS approach in the scenario depicted in FIG. 16. For this, that vehicle can select 6>D nodes, increasing the crowd size by 2 vehicles by including either node 29 or node 31 in its own request. The resulting crowd size is then 25, or 86% of all non-revoked nodes.

In general, it is easy to compute the number of additional nodes to be picked beyond D if the list of nodes available at each depth is available. Namely, as already discussed, each extra node from depth d adds $2^{D-d}$ to the crowd size. Similarly to FSS, though, the actual privacy in VSS may require that every request is unlinkable to each other, or different requests might allow the responder to infer which vehicle is making them.

The bandwidth cost when using the VSS approach depends on the desired crowd size, as well as on the number of nodes available at the shallowest depths of the tree. Simulations show that this approach scales quite well for realistic sizes of activation trees and the number of revocations.

Analysis and Results

Both ACPC and C-ITS address certain limitations of CRLs discussed herein. Namely, in the specific case of ACPC: it supports vehicle unrevocation, without requiring certificate re-provisioning; it involves a lower storage cost, because activation codes can be discarded after usage; and it avoids the processing overhead involved in verifying a certificate's revocation status, since the only certificates that can be decrypted are those owned by non-revoked vehicles.

Regarding bandwidth usage and privacy, ACPC can be seen as a direct optimization of the frequent provisioning strategy adopted in C-ITS, in particular when the proposed DR, FSS, and VSS approaches are adopted. After all, vehicles in C-ITS must identify themselves periodically, giving away their privacy toward system authorities so their revocation status can be verified before new pseudonym certificates are provisioned. Conversely, the DR, FSS, and VSS strategies give vehicles more flexibility on how much privacy is traded for bandwidth savings when getting ACPC-based activation code, besides being able to leverage caching and peer-to-peer communications (even without a secure channel). In particular, if vehicles accept being identified during this process, as in C-ITS, the DR approach can be adopted so the bandwidth usage is simply a D-bit request followed by a 16-byte response. In comparison, vehicles in C-ITS are expected to download at most 100 pseudonym certificates for each 3-months (i.e., 13-weeks) period, which translates to up to 1,300 certificates. For typical 117-byte pseudonym certificates, this means a bandwidth usage of 144.5 KiB per requesting vehicle. Even ignoring ancillary overheads, this bandwidth cost would be almost 10,000 times larger than providing a single 16-byte activation code per vehicle. For a fleet comparable in size with the one in the United States, which reached 272 million vehicles in 2018, this means that the server-side overhead may be reduced from 37.6 TiB to 4.1 GiB for every activation period. The FSS and VSS approaches reduce this gain, but aim to remain competitive with C-ITS (and CRLs) in terms of bandwidth usage while improving the vehicle's privacy.

In some examples, to assess such benefits both theoretically and experimentally, as well as compare the different approaches hereby proposed, a simulator for activation trees can be used. The simulator is able to revoke a configurable number of leaves from an activation tree. Such revocations can be done either randomly (for simulating an average case), or by targeting leaves that are descendants of the lowest-depth nodes, which then become unavailable for picking (which corresponds to the worst case). The simulator then calculates the size of the whole activation tree, as well as the corresponding bandwidth usage and crowd size obtained with each node selection strategy. The results from this analysis are discussed below.

Bandwidth

We start by analyzing the download and upload costs when a vehicle requests its activation codes at any given activation period, for each of the DR, FSS, and VSS approaches. It is assumed that the encoding of ACPC's activation tree (i.e., the list of nodes available for picking) corresponds to the list of D-bit revoked IDs, which translates to $D \cdot n_r$ bits. Similarly, any requested node is represented using a D-bit string, whereas the value of such nodes consists of 128-bit strings (assuming ACPC is running with a 128-bit security level).

In the DR approach, in some examples, vehicles simply send a D-bit request and receive a 128-bit response. In the worst-case scenario, where vehicles wish to request an internal node but do not have the activation tree's encoding locally cached, an additional download overhead of $D \cdot n_r$ bits would apply.

Conversely, in the FSS approach, in some examples, vehicles are required to obtain the activation tree's encoding, once again at a cost of downloading at most $D \cdot n_r$ bits (assuming it is not already cached). Then, the vehicle requests and receives D nodes, which translates to upload and download costs of $D^2$ and $128 \cdot D$ bits, respectively.

Lastly, in the VSS approach, in some examples, the number of nodes requested depends on the desired privacy settings and on the distribution of revocations among the tree's leaves. The average number of nodes requested grows approximately logarithmically with $n_r$, which means at a pace smaller than the $n_r \cdot \lg(n_t/n_r)$ upper limit observed for the whole activation tree. The reason for this behavior is that nodes from lower depths, which provide a higher crowd size, are removed from the activation tree at a logarithmic pace; for example, to remove all nodes from depth d, at least $2^d$ leaves must be revoked. Whenever a depth d is depleted of nodes, it takes two nodes from depth d+1 to get the same crowd size that would be obtained with a node from depth d. All in all, and although the download costs in the VSS approach can be 2 to 3 times larger than in the FSS approach, the total amount of data remains small: even for 50,000 revocations, VSS's extra privacy incurs a download size below 450 KiB in the worst-case, and below 335 KiB on average, of which 244 KiB refers to the activation tree's encoding.

Comparison

Figure 18:
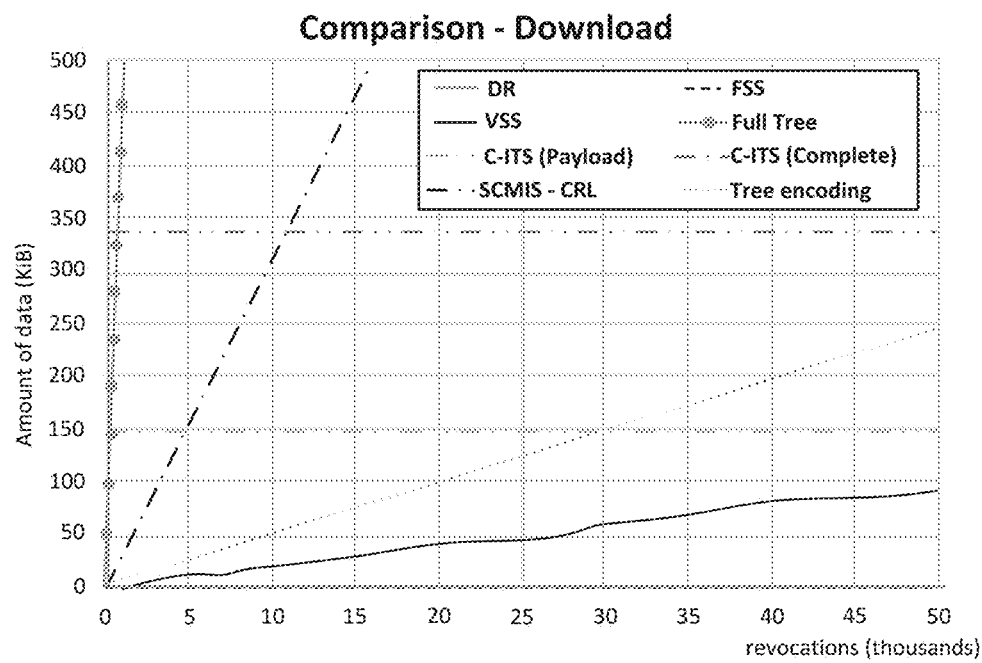
FIGS. 18, 19, and 20 illustrate comparisons of example results for various revocation approaches, according to some embodiments.
Figure 19:
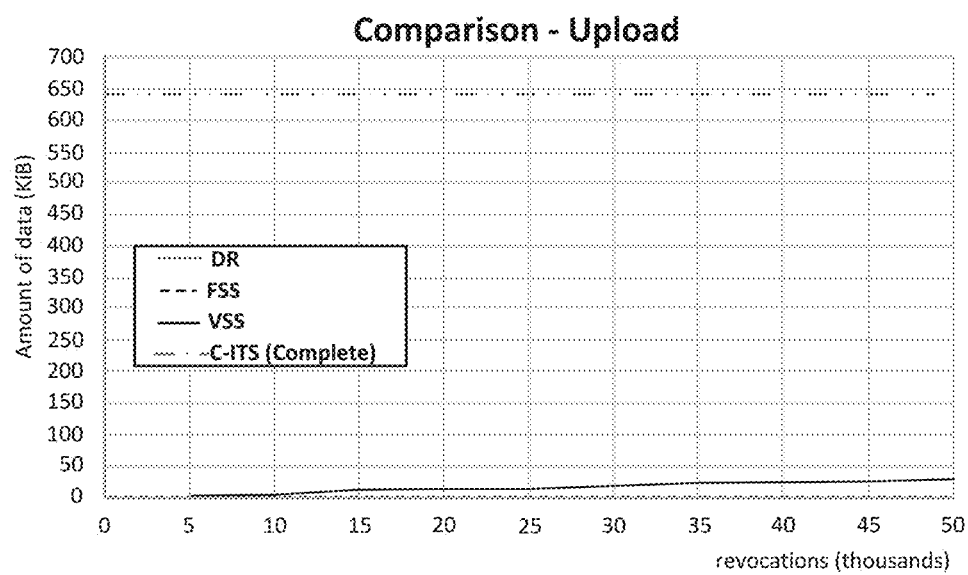

FIGS. 18 and 19 illustrate comparisons of example results (e.g., bandwidth costs) for various revocation approaches, namely ACPC (including DR, FSS, VSS, and the broadcast approaches), C-ITS, and the original SCMS with CRLs. In particular, FIGS. 18 and 19 compare the various approaches' overall downstream and upstream costs for different values of $n_r$. For ACPC's broadcast approach, the simulator obtained the average number of nodes in the entire activation tree; the corresponding download costs are computed simply as 128 bits per node, plus 40 bits per revoked ID (from which the IDs of the nodes can be inferred). For the C-ITS certificates, two cases are considered when computing the underlying downstream costs: (1) ignoring any overhead, so the only cost refers to the 117-bytes certificate payload; and (2) estimating the actual C-ITS certificate response message based on its specification, which means 265 bytes for each certificate. Similarly, for the upstream cost analysis, the size of a C-ITS certificate request message is estimated to be around 505 bytes.

Concerning the download costs at vehicles, FIG. 18 shows that downloading the entire activation tree (Full Tree) results in low scalability: it becomes the most expensive method after approximately 400 revocations. SCMS with CRLs is the second least scalable approach. Even though such a burden may be tackled via delta-CRLs, so only updates need to be downloaded, this would not address the other drawbacks of this approach previously discussed. In addition, delta updates could be similarly employed to the download of the activation tree encoding in the DR, FSS, and VSS approaches, considerably reducing their downstream costs. Indeed, FIG. 18 shows that the amount of data downloaded for the DR, FSS, and VSS approaches remain much lower than any alternative strategy or approach when the tree's encoding is not taken into account. In addition, even if the tree encoding is downloaded in every activation period, DR, FSS, and VSS approaches remain quite competitive: all three methods are more efficient than C-ITS in a scenario with less than 50 thousand revocations. If compared with C-ITS's payload only, then the break-even for DR, FSS, and VSS approaches, as seen in these examples, would be around 22, 22 and 30 thousand revocations, respectively.

In terms of upload costs on the vehicle-side, obtaining the full ACPC activation tree or CRLs precludes any specific need for upstream communication. After all, both data structures can be obtained through a generic request or via broadcast, with a negligible upstream cost. For this reason, FIG. 19 only depicts the costs for CITS, DR, FSS and VSS. As observed in this figure, C-ITS is quite inefficient regarding this metric. This is explained by the combination of two factors: (1) for better privacy, C-ITS requires vehicles to generate one request per pseudonym certificate, meaning up to 1,300 requests per period; and (2) such requests are not very small, since each one contains a public key encrypted and signed by the vehicle, and the entire request is also encrypted and signed. In comparison, the requests in the DR approach take a single 40-bits node identifier (i.e., 5 bytes), while the FSS approach involves D=40 of such identifiers (i.e., 200 bytes). Even though the upstream cost in the VSS approach is not as negligible, for the simulated privacy level of 10% it still remains close to 64 KiB, even if the worst-case scenario for 50,000 revocations (the maximum number shown in this figure) is considered. Since this corresponds to 10% of the C-ITS approach, the results demonstrate that ACPC can provide advantages compared to C-ITS when the goal is avoiding upstream costs.

Privacy

Figure 20:
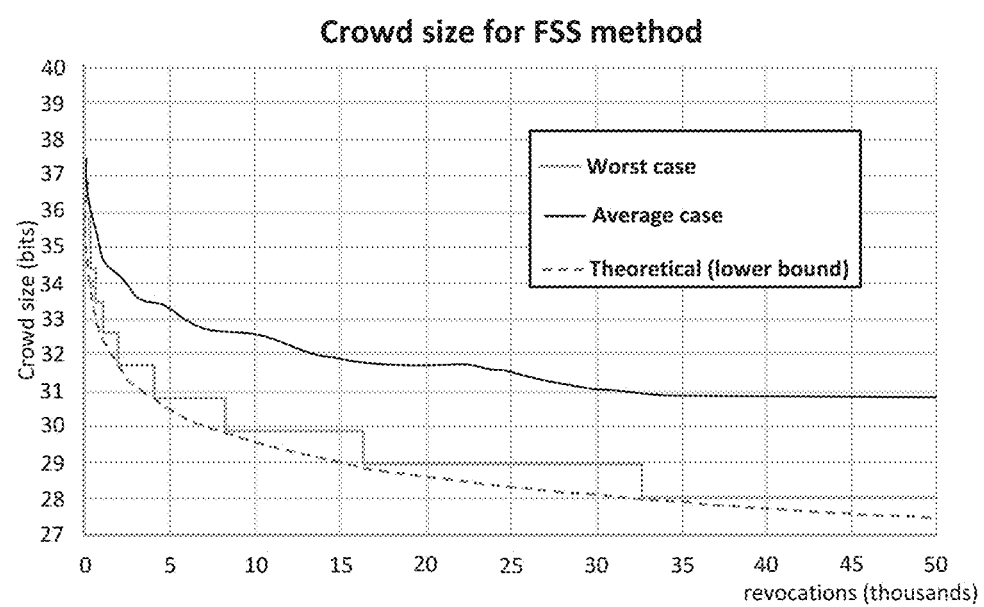

The privacy obtained by the DR approach may be similar to C-ITS (i.e., not much privacy). The VSS approach provides a configurable privacy level. Example results for the crowd size obtained with the FSS approach are shown in FIG. 20. In particular, FIG. 20 shows the results for $0 \leq n_r \leq 50,000$, considering the lower bound formula given above.

This figure shows that the crowd size obtained when requesting D nodes from the activation tree is inversely proportional to the number of revoked vehicles. Nevertheless, the average and worst-case privacy loss decrease roughly logarithmically with $n_r$. After all, to remove all nodes from the activation tree's depth d, so they cannot be picked for increasing the crowd size by $2^{D-d}$, there must be at least 2d revocations. Hence, nodes from the lowest depths become unavailable quite quickly. Nevertheless, those from intermediate depths, which are still able to provide a large amount of privacy when picked, require a huge number of revocations before they cannot be included in vehicles' requests anymore. Indeed, simulations show that, for 50,000 revocations, on average a vehicle can still be confused with more than 230 (out of 240) of its peers when requesting activation codes using the FSS strategy.

The revocation of misbehaving vehicles is an important requirement in VPKIs. However, such revocation can be challenging, in particular, because the typical approach of relying on CRLs is not ideal in vehicular networks. Among the solutions for tackling this issue, ACPC uses caching for reducing the overall costs of certificate distribution and revocation in V2X systems. More precisely, the vehicle itself acts as a caching unity for its own (encrypted) certificates, but it can only obtain the activation codes required for decrypting them while it is not revoked. In addition, activation codes for non-revoked certificates can be obtained and cached by any connected device (e.g., webservers, cellphone towers, or mobile phones), facilitating their distribution over any (potentially insecure) channel. The result can be seen as an optimization of schemes that avoid CRLs by frequently provisioning certificates to vehicles (e.g., C-ITS). Indeed, ACPC avoids the burden of (1) establishing a secure vehicle-server connection; (2) mutually authenticating the parties; and only then (3) allowing vehicles to download their pseudonym certificates, at a cost of hundreds or thousands of bytes per certificate. Given the large scale of V2X systems, where hundreds of millions of vehicles should be loaded with thousands of certificates every few months, the practical benefits of such an approach can be quite significant.

According to embodiments of the present disclosure, systems and methods are provided as an alternative or supplemental approaches to ACPC's mechanism for distributing activation codes, originally done via broadcast. A benefit of the broadcast model is that it preserves the anonymity of the receiver and does not require vehicles to have bi-directional connectivity. The bandwidth costs, however, do not boil down to a single activation code, but grow approximately linearly with the number of revoked vehicles, reaching the order of megabytes for about 10,000 revocations. The proposed approaches strike a balance between privacy and bandwidth efficiency. In particular, in a scenario where vehicles can abdicate from anonymity when requesting/activating their certificates (e.g., similarly to C-ITS), the direct request (DR) approach allows this task to be accomplished by means of a simple 16-byte activation code. Conversely, if a vehicle prefers to retain some level of anonymity when requesting activation codes, it can either: (1) download the entire activation tree, for maximum privacy but also maximum bandwidth usage; (2) employ the fixed-size subset (FSS) method, downloading less than 1 KiB for a privacy level that degrades logarithmically with the number of revocations $n_r$; or (3) adopt the variable-size subset (VSS) approach, for which a configurable privacy level can be obtained with a logarithm increase on the download costs as $n_r$ grows.

The embodiments described above illustrate but do not limit the invention. For example, the techniques described for vehicles can be used by other mobile systems, e.g., pedestrians' smartphones or other mobile systems equipped with computer and communication systems 150. The term "vehicle" is not limited to terrestrial vehicles, but includes aircraft, boats, space ships, and maybe other types of mobile objects. The vehicle techniques can be also be used by non-mobile systems, e.g., they can be used on a computer system.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures typically represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

The invention claimed is:

1. A method for revoking one or more of a plurality of entities in a vehicular public-key infrastructure, the method balancing privacy and efficiency, the method comprising:
   receiving by a first entity of the plurality of entities a plurality of digital certificates for use in authentication operations with one or more of the other entities of the plurality of entities, wherein each digital certificate is to be activated by an associated activation code, wherein the activation codes are generated by a certificate access manager and distributed through an activation tree, the activation tree comprising a plurality of nodes; and
   sending by the first entity to the certificate access manager an activation code request, wherein the activation code request is made according to one of the following approaches:
   a direct request approach;
   a fixed-size subset approach; and
   a variable-size subset approach;
   wherein the direct request approach provides the least privacy for the first entity and the most efficiency with respect to bandwidth, and wherein the variable-size subset approach provides the most privacy to the first entity and the least efficiency with respect to bandwidth;
   wherein the plurality of nodes of the activation tree are organized in 0 to D depths, wherein a node at depth 0 is a root node, wherein each node at depth D is a leaf node that may correspond to a respective one of the plurality of entities, and wherein each node at a depth between 0 and D−1 may support two nodes at another depth such that the activation tree supports distribution of activation codes for up to $2^D$ entities;
   wherein in the variable-size subset approach the activation code request includes information for up to more than D nodes, wherein the up to more than D nodes include a node at depth d on the path between the respective leaf node and the root node, wherein the up to more than D nodes includes up to one randomly selected node at each depth other than d, wherein the up to more than D nodes includes at least one respective leaf node for an entity other than the first entity.

2. The method of claim 1, wherein in the direct request approach the activation code request includes information for a respective leaf node of the first entity or any node on a path between the respective leaf node and the root node.

3. The method of claim 1, wherein in the fixed-size subset approach the activation code request includes information for up to D nodes, wherein the up to D nodes include a node at depth d on the path between the respective leaf node and the root node, wherein the up to D nodes includes up to one randomly selected node at each depth other than d.

4. The method of claim 1, wherein each digital certificate is encrypted and the associated activation code is used to decrypt the digital certificate.

5. The method of claim 1, wherein each activation code corresponds to an interval of time for which the associated digital certificate is to be activated.

6. The method of claim 1, wherein any one of the plurality of entities can be revoked by not allowing it to receive any activation codes, thereby preventing the revoked entity from using any digital certificates.

7. A system for revoking one or more of a plurality of entities in a vehicular public-key infrastructure, the system balancing privacy and efficiency, the system comprising:
   one or more processors and computer memory at a first entity of the plurality of entities, wherein the computer memory stores program instructions that when run on the one or more processors cause the first entity to:
   receive a plurality of digital certificates for use in authentication operations with one or more of the other entities of the plurality of entities, wherein each digital certificate is to be activated by an associated activation code, wherein the activation codes are generated by a certificate access manager and distributed through an activation tree, the activation tree comprising a plurality of nodes; and
   send to the certificate access manager an activation code request, wherein the activation code request is made according to one of the following approaches:
   a direct request approach;
   a fixed-size subset approach; and
   a variable-size subset approach;
   wherein the direct request approach provides the least privacy for the first entity and the most efficiency with respect to bandwidth, and wherein the variable-size subset approach provides the most privacy to the first entity and the least efficiency with respect to bandwidth;
   wherein the plurality of nodes of the activation tree are organized in 0 to D depths, wherein a node at depth 0 is a root node, wherein each node at depth D is a leaf node that may correspond to a respective one of the plurality of entities, and wherein each node at a depth between 0 and D−1 may support two nodes at another depth such that the activation tree supports distribution of activation codes for up to $2^D$ entities;
   wherein in the variable-size subset approach the activation code request includes information for up to more than D nodes, wherein the up to more than D nodes include a node at depth d on the path between the respective leaf node and the root node, wherein the up to more than D nodes includes up to one randomly selected node at each depth other than d, wherein the up to more than D nodes includes at least one respective leaf node for an entity other than the first entity.

8. The system of claim 7, wherein the system is implemented in a hardware security module.

9. The system of claim 7, wherein in the direct request approach the activation code request includes information for a respective leaf node of the first entity or any node on a path between the respective leaf node and the root node.

10. The system of claim 7, wherein in the fixed-size subset approach the activation code request includes information for up to D nodes, wherein the up to D nodes include a node at depth d on the path between the respective leaf node and the root node, wherein the up to D nodes includes up to one randomly selected node at each depth other than d.

11. The system of claim 7, wherein each digital certificate is encrypted and the associated activation code is used to decrypt the digital certificate.

12. The system of claim 7, wherein each activation code corresponds to an interval of time for which the associated digital certificate is to be activated.

13. The system of claim 7, wherein any one of the plurality of entities can be revoked by not allowing it to receive any activation codes, thereby preventing the revoked entity from using any digital certificates.

14. A method for revoking one or more of a plurality of entities in a vehicular public-key infrastructure, the method balancing privacy and efficiency, the method comprising:
receiving by a certificate access manager from a first entity of the plurality of entities an activation code request, wherein the activation code request is made according to one of the following approaches:
a direct request approach;
a fixed-size subset approach; and
a variable-size subset approach;
wherein the direct request approach provides the least privacy for the first entity and the most efficiency with respect to bandwidth, and wherein the variable-size subset approach provides the most privacy to the first entity and the least efficiency with respect to bandwidth; and
generating by the certificate access manager one or more activation codes, wherein each activation code can be used to activate one or more associated digital certificates, each digital certificate for use in authentication operations with a respective one of the plurality of entities, wherein the activation codes are distributed through an activation tree, the activation tree comprising a plurality of nodes;
wherein the plurality of nodes of the activation tree are organized in 0 to D depths, wherein a node at depth 0 is a root node, wherein each node at depth D is a leaf node that may correspond to a respective one of the plurality of entities, and wherein each node at a depth between 0 and D−1 may support two nodes at another depth such that the activation tree supports distribution of activation codes for up to $2^D$ entities;
wherein in the variable-size subset approach the activation code request includes information for up to more than D nodes, wherein the up to more than D nodes include a node at depth d on the path between the respective leaf node and the root node, wherein the up to more than D nodes includes up to one randomly selected node at each depth other than d, wherein the up to more than D nodes includes at least one respective leaf node for an entity other than the first entity.

15. The method of claim 14, wherein in the direct request approach the activation code request includes information for a respective leaf node of the first entity or any node on a path between the respective leaf node and the root node.

16. The method of claim 14, wherein in the fixed-size subset approach the activation code request includes information for up to D nodes, wherein the up to D nodes include a node at depth d on the path between the respective leaf node and the root node, wherein the up to D nodes includes up to one randomly selected node at each depth other than d.

* * * * *